US006978460B2

(12) United States Patent
Arakawa

(10) Patent No.: US 6,978,460 B2
(45) Date of Patent: Dec. 20, 2005

(54) PROCESSOR HAVING PRIORITY CHANGING FUNCTION ACCORDING TO THREADS

(75) Inventor: Fumio Arakawa, Kodaira (JP)

(73) Assignee: Renesas Technology Corp., Tokyo (JP)

( * ) Notice: Subject to any disclaimer, the term of this patent is extended or adjusted under 35 U.S.C. 154(b) by 555 days.

(21) Appl. No.: 10/022,533

(22) Filed: Dec. 20, 2001

(65) Prior Publication Data

US 2002/0129227 A1 Sep. 12, 2002

(30) Foreign Application Priority Data

Mar. 7, 2001 (JP) ............................. 2001-062792

(51) Int. Cl.[7] ................................................ G06F 9/00

(52) U.S. Cl. .......................... 718/103; 712/22; 712/23; 712/24

(58) Field of Search ........................... 718/1, 104, 105, 718/106, 107, 100, 103; 712/22–24

(56) References Cited

U.S. PATENT DOCUMENTS

| | | | | |
|---|---|---|---|---|
| 5,574,928 A | * | 11/1996 | White et al. | 712/23 |
| 5,812,811 A | | 9/1998 | Dubey et al. | |
| 5,881,307 A | * | 3/1999 | Park et al. | 712/23 |
| 6,154,831 A | * | 11/2000 | Thayer et al. | 712/208 |

FOREIGN PATENT DOCUMENTS

JP 8-249183 9/1996

OTHER PUBLICATIONS

Diefendorff,"Simultaneous Multithreading Exploits Instruction- and Thread-level Paralelism", Dec.-1999, Mircroprocessor Repor vol. 13, No. 16, pp. 1-8.*

Lo et al, "Converting Thread-Level Parallelism to Instruction-Level Parallelism via Simultaneous Multithreading", ASPLOS, 200 pp. 322-354.*

Flauthner et al, "Thread-level Parallelism and Interactive Performance of Destop Applicants", ACM. vol. 15, No. 3, Aug. 1997 pp. 1-10.*

Microprocessor Report, vol. 13, No. 13, Oct. 6, 1999, "Merced Shows Innovative Design", pp. 1, 6-10.

Microprocessor Report, vol., 13, No. 16, Dec. 6, 1999, "Compaq Chooses SMT for Alpha", pp. 1, 6-11.

Microprocessor Report, vol. 14, Archive.3, Mar. 2000, "NEC Decands Merlot", pp. 14, 15.

* cited by examiner

*Primary Examiner*—Meng-Al T. An
*Assistant Examiner*—Phuong N. Hoang
(74) *Attorney, Agent, or Firm*—Mattingly, Stanger, Malur & Brundidge, P.C.

(57) ABSTRACT

A time multiplex changing function for priorities among threads is added to a multi-thread processor, and capability for large-scale out-of-order execution is achieved by confining the flows of data among threads, prescribing the execution order in the flow sequence, and executing a plurality of threads having data dependency either simultaneously or in time multiplex.

11 Claims, 19 Drawing Sheets

```
C SOURCE CODE
N=8;
for(i=0; i<N; i++)
      y+=x[i];
```

```
#1.                     LDRS _repeat_start
#2.                     LDRE _repeat_end
#3.                     LDRC #8
#4.                     MOV  #x_addr,r0
#5.                     MOV  #y_addr,r1
#6.                     MOV  #0,r3
#7. _repeat_start       MOV  @r0+,r2
#8. _repeat_end         ADD  r2,r3
#9.                     MOV  r3,@r1
```

```
LDRS _repeat_start : MAKE REPEAT START PC _repeat_start
LDRE _repeat_end   : MAKE REPEAT END PC _repeat_end
LDRC #N            : MAKE REPEAT NUMBER N
```

FIG. 6

```
#1.LDRS _repeat_start    #7.MOV  @r0+,r2     #11. _repeat_start ADD r2,r3       #19.ADD r2,r3
#2.LDRE _repeat_end      #8.MOV  @r0+,r4     #12.               MOV @r0+,r2     #20.ADD r4,r3
#3.LDRC #2               #9.MOV  @r0+,r5     #13.               ADD r4,r3       #21.ADD r5,r3
#4.MOV  #x_addr,r0       #10.MOV  @r0+,r6    #14.               MOV @r0+,r4     #22.ADD r6,r3
#5.MOV  #y_addr,r1                           #15.               ADD r5,r3       #23.MOV r3,@r1
#6.MOV  #0,r3                                #16.               MOV @r0+,r5
                                             #17.               ADD r6,r3
                                             #18. _repeat_end   MOV @r0+,r6
```

| | | | | | |
|---|---|---|---|---|---|
| #1. | MOV #8,r4 | #5.MOV | @r0+,r2 | #9. | TERM |
| #2. | MOV #x_addr,r0 | #6.ADD | r2,r3 | #10. _exit | THABORT |
| #3. | MOV #y_addr,r1 | #7.DT | r4 | #11. | MOV r3,@r1 |
| #4. _thread0 | FORK _thread0 | #8.BT/S | _exit | | |

FIG. 10

```
#1.LDRS _repeat_start
#2.LDRE _repeat_end
#3.MOV #x_addr,r0
#4.FORK  thread0
#5.LDRC  #7
#6.MOV   #y_addr,r1

#7. _thread0         MOV @r0+,r2
#8.                   UNCOND_SUSPEND
#9. _repeat_start    FORK _thread1
#10.                  ADD r2,r3
#11. _thread1         MOV @r0+,r2
#12. _repeaat_end    UNCOND_SUSPEND
#13.                  ADD r2,r3
#14.                  MOV r3,@r1
```

FIG. 12

| | DATA NUMBER | LOAD LATENCY | OUT OF ORDER, SORTWARE PIPELINE | MERLOT METHOD | PRIOR ART (JPA8-249183) | CONVENTIONAL PROCESSOR |
|---|---|---|---|---|---|---|
| #1 | N | L | N+L+1 | MAX(2N+L+2, (L+3)N/4+7) | MAX(3N+L+1, (L−1)N+5) | LN+2 |
| #2 | | 4 | N+5 | 2N+7 | 3N+5 | 4N+2 |
| #3 | | 30 | N+31 | 33N/4+7 | 29N+5 | 30N+2 |
| #4 | 8 | 4 | 13 | 23 | 29 | 34 |
| #5 | | 30 | 39 | 73 | 237 | 242 |
| #6 | 32 | 4 | 37 | 51 | 101 | 130 |
| #7 | | 30 | 63 | 271 | 933 | 962 |

FIG. 15
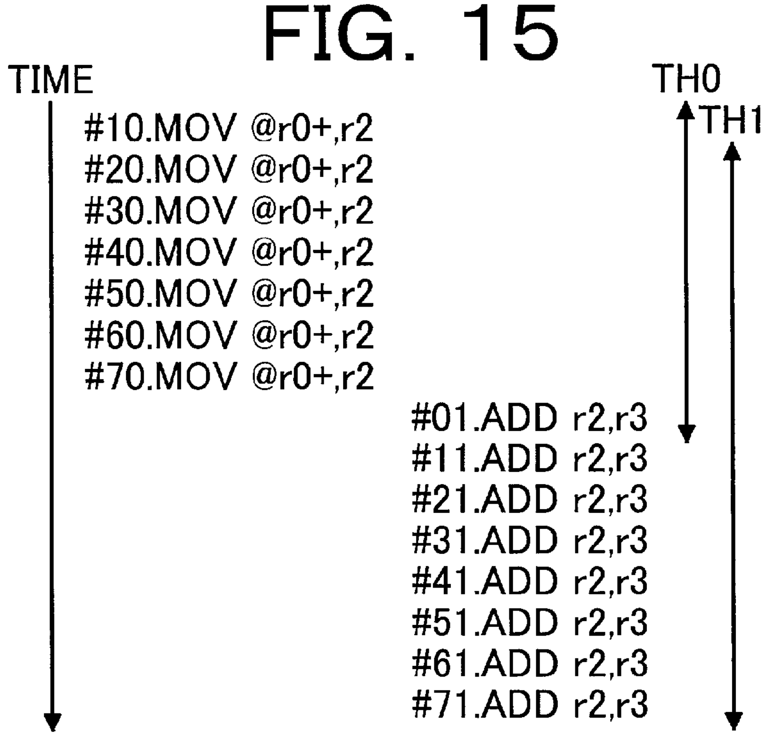
FIG. 16
| | | | |
|---|---|---|---|
| #1. | LDRE _repeat0 | #11._thred1 | LDRS _repeat1 |
| #2. | MOV #x_addr,r0 | #12. | LDRE _repeat1 |
| #3. | LDRS _repeat0 | #13. | LDRC #8 |
| #4. | MOV #y_addr,r1 | #14. | NOP |
| #5. | THRDG/R _thred1 | #15._repeat1 | ADD r2,r3 |
| #6. | MOV #0,r3 | #16. | MOV r3,@r1 |
| #7. | LDRC #8 | #17. | THRDE |
| #8. | NOP | | |
| #9._repeat0 | MOV @r0+,r2 | | |
| #10. | SYNCE | | |
THRDG/R: THREAD GENERATION REPEAT TYPE
THRDE : THREAD END
SYNCE : THREAD END SYNCHRONISM
FIG. 17
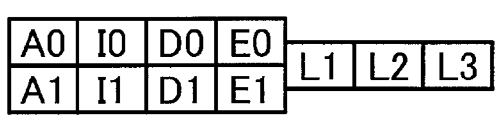

FIG. 21

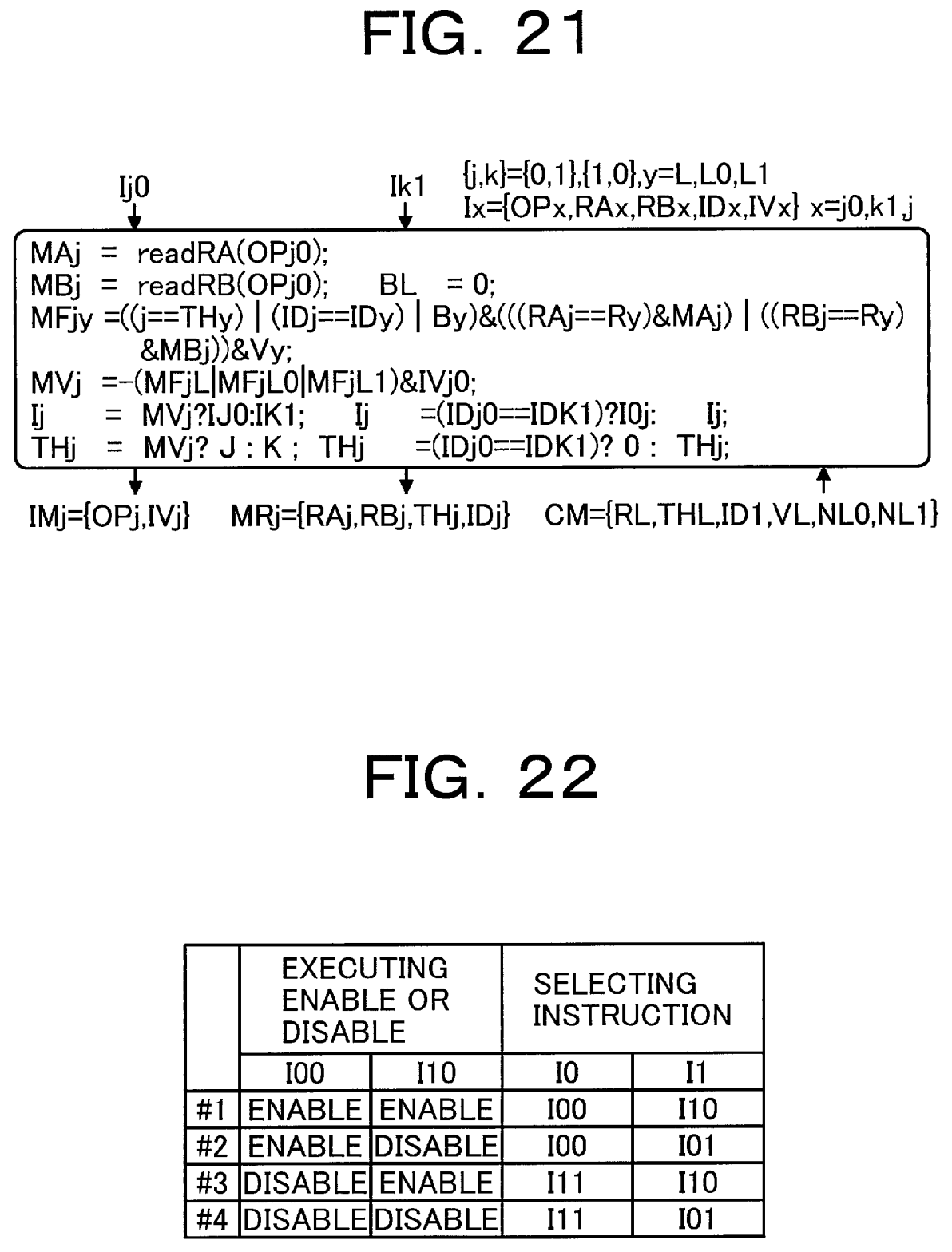

```
Ij0                         Ik1    {j,k}={0,1},{1,0},y=L,L0,L1
                                   Ix={OPx,RAx,RBx,IDx,IVx} x=j0,k1,j
MAj  =  readRA(OPj0);
MBj  =  readRB(OPj0);     BL   = 0;
MFjy =((j==THy) | (IDj==IDy) | By)&(((RAj==Ry)&MAj) | ((RBj==Ry)
        &MBj))&Vy;
MVj  =~(MFjL|MFjL0|MFjL1)&IVj0;
Ij     =  MVj?IJ0:IK1;     Ij     =(IDj0==IDK1)?I0j:    Ij;
THj   =  MVj? J : K ;  THj     =(IDj0==IDK1)? 0 :  THj;

IMj={OPj,IVj}   MRj={RAj,RBj,THj,IDj}   CM={RL,THL,ID1,VL,NL0,NL1}
```

FIG. 22

| | EXECUTING ENABLE OR DISABLE | | SELECTING INSTRUCTION | |
|---|---|---|---|---|
| | I00 | I10 | I0 | I1 |
| #1 | ENABLE | ENABLE | I00 | I10 |
| #2 | ENABLE | DISABLE | I00 | I01 |
| #3 | DISABLE | ENABLE | I11 | I10 |
| #4 | DISABLE | DISABLE | I11 | I01 |

CR={Ry,BPxy,Wx,Sx,Mz}
x=E0,E1,L3,TB0,TB1,TB2, y=A0,B0,A1,B1, z=0,1,2

```
SBL=((TH0==0)&LV0)|((TH0==1)&=-LV1);
if(SBL){RL=RB0;THL=TH0;IDL=ID0;VL=LV0&-STL0}
else    {RL=RB1;THL=TH1;IDL=ID1;VL=LV1&-STL1}
```

FIG. 27

```
STL0=((BPL0A0 | BPL1A0 | BPL2A0) & VA0) |
       ((BPL0B0 | BPL1B0 | BPL2B0) & VB0) ;
STL1=((BPL0A1 | BPL1A1 | BPL2A1) & VA1) |
       ((BPL0B1 | BPL1B1 | BPL2B1) & VB1) ;
STL0  |=STL1 & (TH0==1) | ((SBL==1) &LV0) ;
STL1  |=STL0 & (TH0==0) | ((SBL==0) &LV1) ;
STH=  (~GTH0 & STH) | ETH1;
SX  =  VX & ((THX==1) |   BX |   STH)          {X=TB0,TB1,TB2,L3,E0,E1}
CX  =  VX & ((THX==0) &~ BX &~ STH)
```

| STATE | | | | | | OUTPUTS | | | |
|---|---|---|---|---|---|---|---|---|---|
| CTB2 | CTB1 | CTB0 | CL3 | CE0 | CE1 | M2 | M1 | M0 | STLTB |
| * | * | * | 0 | 0 | 0 | TB2 | TB1 | TB0 | 0 |
| * | 0 | * | 0 | 0 | 1 | TB1 | TB0 | E1 | 0 |
| 0 | * | * | | | | | | | |
| * | 0 | * | 0 | 1 | 0 | TB1 | TB0 | E0 | 0 |
| 0 | * | * | | | | | | | |
| * | 0 | * | 1 | 0 | 0 | TB1 | TB0 | L3 | 0 |
| 0 | * | * | | | | | | | |
| 0 | 0 | * | 0 | 1 | 1 | TB0 | E0 | E1 | 0 |
| | | | 1 | 0 | 1 | TB0 | L3 | E1 | 0 |
| | | | 1 | 1 | 0 | TB0 | L3 | E0 | 0 |
| 0 | 0 | 0 | 1 | 1 | 1 | L3 | E0 | E1 | 0 |
| OTHERS | | | | | | TB2 | TB1 | TB0 | 1 |

```
NM2=(M2==TB2)?NTB2:((M2==TB1)?NTB1:((M2==TB0)?NTB0:((M2==L3)?NL3)));
NM1=(M1==TB1)?NTB1:((M1==TB0)?NTB0:((M1==L3  )?NL3  :((M1==E0)?NE0)));
NM0=(M0==TB0)?NTB0:((M0==L3  )?NL3  :((M0==E0   )?NE0  :((M0==E1)?NE1)));
```

PROCESSOR HAVING PRIORITY CHANGING FUNCTION ACCORDING TO THREADS

BACKGROUND OF THE INVENTION

1. Field of the Invention

The present invention relates to a data processing device, such as a microprocessor or the like, and more particularly to an effective means for thread management in a multi-thread processor. The multi-thread processor is a process capable of executing a plurality of threads either on a time multiplex basis or simultaneously without requiring the intervention of software, such as an operating system or the like. The threads constitute a flow of instructions having at least an inherent program counter and permit sharing of a register file among them.

2. Prior Art

Many different methods are available for higher speed execution of a serial execution flow by upgrading effective parallelism to a higher level than the serial execution: (1) use of an SIMD (Single Instruction Multiple Data) instruction or a VLIW (Very Long Instruction Word) instruction for simultaneous execution of a single instruction into which a plurality of mutually independent processes are put together, (2) a superscalar method for simultaneous execution of a plurality of mutually independent instructions, (3) an out-of-order execution method of preventing the degradation of effective parallelism and reducing stalls due to dependency among data and resource conflict by executing the flow on an instruction by instruction basis in a different order from that of the serial execution flow, (4) software pipelining to execute a program in which the natural order of the serial execution flow is rearranged in advance to achieve the highest possible level of effective parallelism, and (5) a method of dividing the serial execution flow into a plurality of instruction columns consisting of a plurality of instructions and having this plurality of instruction columns executed by a multi-processor or a multi-thread processor. (1) and (2) are basic methods for parallel processing, (3) and (4), methods for increasing the number of local parallelisms extract, and (5), a method for extracting a general parallelism.

Intel's Merced described in MICROPROCESSOR REPORT, vol. 13, no. 13, Oct. 6, 1991, pp. 1 and 6–10, is mounted with a VLIW system referred to in (1) above, and is further mounted with a total of 256 64-bit registers, comprising 128 each for integers and floating points for use in the software pipelining system mentioned in (4). The large number of registers permits parallelism extraction in the order of tens of instructions.

Compaq's Alpha 21464 described in MICROPROCESSOR REPORT, vol. 13, no. 16, Dec. 6, 1991, pp. 1 and 6–11, is mounted with a superscalar referred to in (2) above, an out-of-order system stated in (3) and a multi-thread system mentioned in (5). It extracts parallelisms in the order of tens of instructions with a large capacity instruction buffer and reorder buffer, further extracts a more general parallelism by a multi-thread method and performs parallel execution by a superscalar method. It is therefore considered capable of extracting an overall parallelism. However, as it does not analyze the relationship of dependency among a plurality of threads, no simultaneous execution of a plurality of threads dependent on one another can be accomplished.

NEC's Merlot described in MICROPROCESSOR REPORT, vol. 14, no. 3, March 2000, pp. 14–15 is an example of multi-processor referred to in (5). Merlot is a tightly coupled on-chip four-parallel processor, executing a plurality of threads simultaneously. It can also simultaneously execute a plurality of threads dependent on one another. In order to facilitate dependency analysis, there is imposed a constraint that a new thread is generated only by the latest existing thread and the new thread comes last in the order of serial execution.

A CPU (Central Processing Unit) in the "speculative parallel instruction threads" in JP-A-8-249183 is an example of multi-thread processor referred to in (5). It is a multi-thread processor for simultaneously executing a main thread and a future threads. The main thread is a thread for serial execution, and the future thread, a thread for speculatively executing a program to be executed in the future in serial execution. Data on a register or memory to be used by the future thread are data at the time of starting the future thread, and may be renewed by the starting time of the future thread in serial execution. If they are renewed, because the data used by the future thread will not be right, the result of the future thread will be discarded, or if not, they will be retained. Whether or not renewal has taken place is judged by checking the program flow until the future thread starting time in possible serial execution by the directions of condition branching and according to whether or not it is a flow to execute an renewal instruction. For this reason, it has the characteristic of requiring no analysis of dependency among the plurality of threads.

SUMMARY OF THE INVENTION

For instance, a program shown in FIG. 1 is a program for adding eight data. A processor for executing this program is supposed to have repeat control instructions like the ones shown in FIG. 2. If a repeat structure is configured of these instructions before the execution of a repeat, repeat control instructions such as a repeat counter updating instruction, a repeat counter check instruction and a condition branching instruction need not be executed during the repeat. Such repeat control instructions are usual for digital signal processors (DSPs) and can be readily applied to general purpose processors as well.

A case is considered in which this program is executed by a two-issued superscalar processor of 4 in load latency in a pipeline configuration shown in FIG. 3. In the drawing, reference sign I denotes an instruction fetch stage; D0 and D1, instruction decode stages; E, an execution stage for addition, store and the like; and L0 through L3, load stages. The pipeline operation takes place as shown in FIG. 4. Referring to FIG. 4, instruction #7 is an instruction to load data from the address of a register r0 to a register r2 and update the register r0 to the next address. Decoding takes place at the instruction decode stage D0, loading is executed in a four-phase cycle of load stages L0 through L3, loaded data become usable at the end of the L3 stage. At the same time, address updating is executed at the L0 stage, and the updated address becomes usable at the end of the L0 stage. On the other hand, instruction #8 is an instruction to execute addition between the register r2 and the register r3 and store the result into the register r3. Decoding takes place at the instruction decode stage D1, addition is performed at the execution stage E, and the result becomes usable at the end of the E stage. Instruction #8 executes the E stage at the next phase of the cycle to the L3 stage of instruction #7 to use the result of loading by instruction #7. Since load latency cannot be concealed, addition of N data takes 4N+2 cycles. With the load latency being denoted by L, this means LN+2 cycles. If an access to an external memory is supposed and a load latency of 30 for instance, addition of N data will take 30N+2 cycles.

Then, if an out-of-order executing function, such as Alpha 21464 mentioned above, is added to the processor, at a load latency of 4, the operation will be as shown in FIG. 5 and completed in N+5 cycles, at a load latency of 30, in N+31 cycles, or at a load latency of L, in N+L+1 cycles. However, to meet a load latency of 30, 60 instruction levels have to be rearranged. If N is set to 30 or above in the program of FIG. 1, the 30 load instructions will be executed while holding 30 ADD instructions out of the 60 instructions in an instruction buffer, and the result will be written back in the original execution order after the execution of the ADD instructions. For this reason, a large capacity instruction buffer and reorder buffer, such as those in Alpha 21464 are required, inviting a drop in the cost-effectiveness of the processor.

If the program of FIG. 1 is increased in speed by a software pipelining method, such as Merced referred to above, at a load latency of 4, the operation will be as shown in FIG. 6. The pipeline will be as shown in FIG. 7, and the program will be completed in five cycles as in the case of the out-of-order execution described above. In this case, three more registers are used than in the program of FIG. 1, and to meet a load latency of 30, the program should be altered into one using 29 extra registers. The number of execution cycles will be N+31. Thus a software pipelining system requires a large number of registers and optimization matching the latency length. In general terms, the number of execution cycles will be MAX (1, L−X+1)N+MAX (L, X)+1 cycles, wherein X is the load latency supposed by the program and L, the actual load latency length. The function expressed in the MAX (expression 1, expression 2) form is the maximum selecting function, according to which the greater of expression 1 and expression 2 is selected. If too low a latency length is supposed, the first term will increased, but if too long a latency is supposed the second term will increase and, moreover, invite a waste of registers. As the length of external memory access latency varies even with a change in the operating frequency alone, the software is poor in versatility. The processor for usual 32-bit instructions has only 32 registers, which means an insufficient number of registers.

Thus, although the above-described methods of Alpha 21464 and Merced can raise the processing speed by parallelism extraction in the order of tens of instructions, they may be either poor in cost-effectiveness or incompatible with usual 32-bit instructions, and accordingly can only be used with an expensive processor.

On the other hand, if the program of FIG. 1 is altered for Merlot referred to above, the altered program will be as shown in FIG. 8. The pipeline will be as shown in FIG. 9, the issue of a future thread will become a bottleneck, and the addition of N data will take 2N+7 cycles. To take note of any one processor, it would take charge of one thread in every four threads, and require seven cycles to process one thread. This means L+3 cycles at a load latency of L. On the other hand, since new thread issues take place at a pitch of two cycles, a new thread can be issued to the same processor in every 2×4=8 cycles. Since threads to be executed by the same processor are serially executed, the execution time is determined according to the greater issue pitch of 3, where the processing time is L+3, and accordingly the addition of N data would take MAX (L+3,8) N/4+7 cycles. At a load latency of 30, it will take 33N/4+7 cycles. The performance is poor for the mounting of four two-issued superscalar processors.

Finally, altering the program of FIG. 1 to match the multi-thread processor of JP-A-8-249183 cited above will result in what is shown in FIG. 10. Since an instruction each is needed for issuing and completing a future thread, altogether four instructions are needed per datum including the two instructions for the actual process. Furthermore, the main thread should arrive without fail at the code executed as a future thread after the future thread issue, because it is determined at the time of arrival whether to adopt or discard the result of execution of the future thread. It is imperative to avoid such a situation that the issue of a future thread for the next repeat processing results in the skip of a repeat and the main thread does not perform the next repeat processing. Therefore, issuing at the beginning of a repeat the future thread at the end of the repeat is the earliest issue of a future thread. As a result, the issue of a future thread becomes a bottle neck in the total execution, and in the two-issued superscalar processor system the addition of N data takes 3N+5 cycles as shown in FIG. 11. In this case, ADD of #10 in FIG. 11 and FORK of #9 three instructions after that are executed simultaneously. Then at a load latency or 30, the execution of these #10 and #9 will take place 26 cycles later than is shown in FIG. 11. As a result, the number of cycles is determined by the load latency to be 29N+5 cycles. In general terms, it is MAX (3N+5, (L−1) N+L+1) cycles. While the hardware volume is than in the aforementioned Alpha 21464, Merced and Merlot systems, the performance is poorer.

The foregoing is summed up in FIG. 12, wherein #1 represents generalization into N in the number of data and L in the load latency level; #2 a case in which the load latency is relatively short, i.e. 4; #3, a case in which the load latency is relatively long, i.e. 30; and #4 through #7, cases in which the number of data and the load latency length are given in specific numerals. It is seen that, especially where the load latency is long, parallelism extraction is difficult with any existing multi-thread processor.

The problem to be solved by the present invention is to make possible parallelism extraction in the order of tens of instructions comparable to Alpha 21464 and Merced and performance enhancement with only a modest addition of hardware elements instead of a large-scale hardware addition as in the case of Alpha 21464 or a fundamental architecture alteration as in Merced. An especially important object of the invention is to make possible parallelism extraction in the order of tens of instructions by improving a multi-thread processor to enable a single processor to execute a plurality of threads.

A conventional multi-thread processor simplifies new thread issues and dependency analysis by assigning an order of serial execution to a plurality of threads. However, by this method, even if the program is as simple as what is shown in FIG. 1, parallelism extraction is difficult. The invention makes possible parallelism extraction in the order of tens of instructions by effectively eliminating these constraints.

While the conventional multi-thread processor assigns a fixed order of serial execution, the invention makes it possible to alter the order of serial execution while a thread is being executed. The invention thereby enables threads to be divided in a different manner from the conventional method. FIG. 13 schematically illustrates the difference in thread division. The number assigned to each instruction in FIG. 13 denotes its position in the order of execution. The smaller its number, the earlier the instruction's position in the order, which therefore is #00, #01, #10, #11, . . . , #71. According to the prior art, serial execution is simply divided on a time multiplex basis and threads are allocated on that basis. For this reason, as many threads as desired to be executed with priority needs to be generated. FIG. 13 shows an example in which division into eight threads takes place, and new threads are issued at a new thread issued instruction FORK. Though not shown, a thread end instruction is also required. If there is a constraint on the number of threads that can be generated, this constraint limits the number of processes to be given priority. According to the invention, threads are allocated to prior processes and others, and these two kinds of processes are executed while subjecting the order of serial execution to a time multiplex alteration. Many prior processes can be done with two threads. Each SYNC in FIG. 13 is a point of alteration in the order of serial execution.

For instance, as there is a serial execution order altering point SYNC between instructions #00 and #10 of TH0 and between instructions #01 and #11 of TH1, instructions #00 and #01, which are before a serial execution order altering point SYNC, are in earlier positions in the order of serial execution than the #10 and following instructions of TH0 and the #11 and following instructions of TH1. Other instructions are similarly given their due positions in the order of serial execution. A serial execution order altering point SYNC can be designated by an instruction. When it is desired to define a repeat structure by a repeat control instruction shown in FIG. 2, no special instruction will be needed if the point of time at which a return from a repeat end PC to a repeat start PC is used as the serial execution order altering point SYNC.

FIG. 14 illustrates a state of thread execution at a load latency of 8 according to the prior art. For the convenience of comparison with the present invention, it is supposed that a FORK instruction can be issued in every cycle. To achieve the highest possible performance, eight threads have to be present at the same time. If the latency is 30, 30 threads will be required. FIG. 15 illustrates a state of thread execution at a load latency of 8 according to the invention. The highest performance can be achieved with only two threads. Even if the latency extends to 30, two threads will be sufficient. Further, as an alteration in the order of serial execution involves only a change in the internal state to be assigned to the instruction, it is easier than a new thread issue instruction FORK, and can be executed in every cycle with simple hardware.

There are three different dependency relationships: flow dependency, reverse dependency and output dependency. With respect to accessing the same register or memory address, flow dependency is a relationship in which "read is done after the end of every prior write"; reverse dependency, one in which "write is done after the end of every prior read;" and output dependency, one in which "write is done after the end of every prior write". If these rules are observed, even if the executing order of instructions changed, the same result can be obtained as in the case of an unchanged order.

Of these relationships of dependency, reverse dependency and output dependency occur when the storage spaces for different data are secured on the same register or memory address on a time multiplex basis. Therefore, if temporary data storage spaces are secured for separate storage, thread execution whose order of serial execution proceeds slowly can be started even if there are reverse dependency and output dependency. Both the present invention and the prior art uses this method for the multi-thread processor.

On the other hand, the rules of flow dependency should be observed. In the conventional multi-thread processor, if the presence or absence of flow dependency is uncertain at the time of executing an instruction, the result of execution is left in the temporary data storage space and, the absence of flow dependency is perceived, it will be stored into the regular storage space or, if the presence of flow dependency is perceived, the processing will be cancelled and retried to obtain a correct result. However, though this system permits normal operation, it guarantees no high speed operation.

The present invention ensures high speed operation by eliminating the possibility of cancellation/retrial. The reason why a multi-thread processor may fail in flow dependency analysis is the possibility that, before a data defining instruction is decoded, another instruction using the pertinent data may decode and execute the data. The invention imposes a constraint that the defining instruction is decoded earlier without fail. Incidentally, in an out-of-order execution system, this problem does not arise because decoding is in order though execution is out of order. Instead, it is necessary to decode more instructions than the instructions to be executed and to select and to the executing part executable instructions.

In the thread division system according to the invention shown in FIG. 13, one of every two threads defines data and the other uses the data. Then, they are defined to be a data defining thread and a data using thread, respectively, and the data defining thread is prohibited from using the data of the data using thread. Thus the data flow is made a one-way stream from the data defining thread to the data using thread. It is defined that, though the data defining thread may pass the data using thread, the data using thread may not pass the data defining thread. As it is unnecessary to analyze the flow dependency of the data defining thread on the data using thread, there will occur no wrong operation even if the data defining thread passes the data using thread, while the data using thread, which will never pass the data defining thread, no error in flow dependency analysis can occur.

The program of FIG. 1 can be modified for use in the present invention into what is shown in FIG. 16. The repeat structure of instruction #9 is defined by instructions #1, #3 and #7, and that of instruction #15, by instructions #11 through #13. By causing a thread generating instruction THRDG/R of the repeat type to start a second thread, the repeat structures of two threads can be configured with the point of time where a return takes place from repeat end PC to repeat start PC as the serial execution order altering point SYNC. The thread having issued the thread generating instruction THRDG/R is the data defining thread, and the thread generated by the thread generating instruction THRDG/R is the data using thread.

It is supposed here that a processor to which the invention is applied has a pipeline configuration of 4 in load latency as shown in FIG. 17. Although it is customary not to expressly refer to instruction address stages A0 and A1 as elements of a pipeline and accordingly reference to them was dispensed in describing the prior art, they will be expressly referred to in describing the operation of the present invention. In this case, the pipeline operates as illustrated in FIG. 18, and the number of execution cycles is N+5. It being supposed that the number of cycles is N+31 at a latency of 30, the latency at L will be N+L+1. Thus, this performance is comparable to that in large-scale out-of-order execution or software pipelining. The pipeline operation shown in FIG. 18 will be described in detail afterward with reference to a specific embodiment.

BRIEF DESCRIPTION OF THE DRAWINGS

FIG. 6 illustrates a case in which the load latency of 4 in the program of FIG. 1 is concealed by a software pipeline.

FIG. 10 illustrates an example in which the program of FIG. 1 is rewritten for use by a multi-thread processor according JP-A-8-249183.

FIG. 12 compares the numbers of cycles required by existing system.

FIG. 15 illustrates thread execution according to the invention at a load latency of 8.

FIG. 16 illustrates an example in which the load latency of 4 is concealed by multiple threads according to the invention.

FIG. 17 illustrates an example of pipeline in a two-issued multi-thread processor.

FIG. 21 illustrates an example of instruction selection part.

FIG. 22 illustrates combinations of selected instructions by an instruction multiplexer.

FIG. 27 illustrates an example of control logic for the scoreboard.

DETAILED DESCRIPTION OF THE PREFERRED EMBODIMENT

Figure 19:
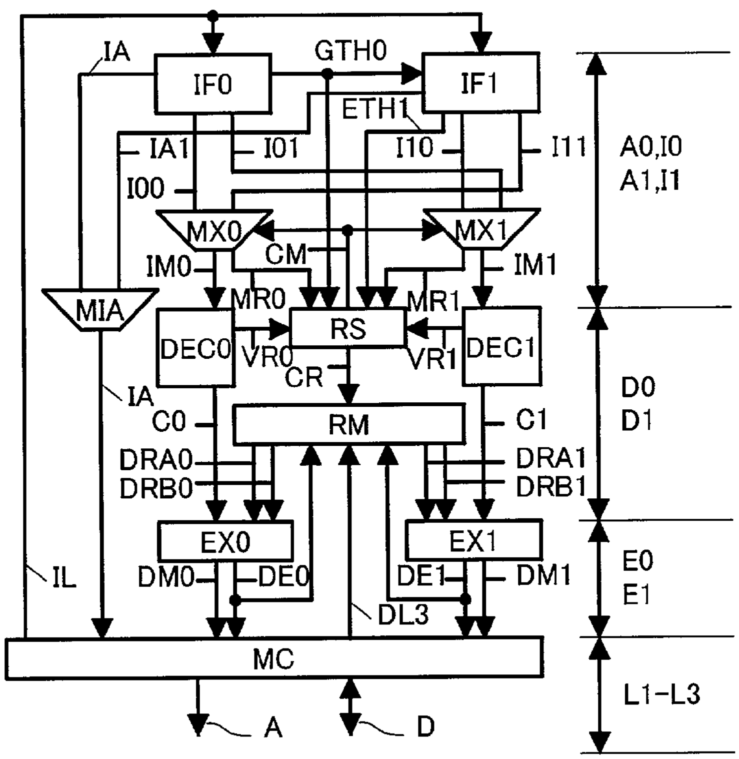
FIG. 19 illustrates a two-thread processor to which the invention is applied.

FIG. 19 illustrates an example of two-thread processor to which the present invention is applied. It consists of instruction supply parts IF0 and IF1, an instruction address multiplexer MIA, instruction multiplexers MX0 and MX1, the instruction decoders DEC0 and DEC1, a register scoreboard RS, a register module RM, an instruction execution part EX0 and EX1, and a memory control part MC. The actions of these constituent parts will be described below. Details of the actions of the instruction supply parts IF0 and IF1, instruction multiplexers MX0 and MX1, register scoreboard RS, and register module RM, which are essential modules of the present invention, will be described later.

In the description of this embodiment of the invention, for the sake of simplicity, it is supposed that the instruction supply part IF0 is fixed to a data defining thread and the instruction supply part IF1 is fixed to a data using thread. Undoing this fixation can be readily accomplished by persons skilled in the art to which the invention is relevant. The instruction multiplexer MX0, instruction decoder DEC0 and instruction execution part EX0 are supposed to constitute a pipe 0, and MX1, DEC1 and EX1, a pipe 1.

The instruction supply part IF0 or IF1 supplies the instruction address multiplexer MIA with an instruction address IA0 or IA1, respectively. The instruction address multiplexer MIA selects one of the instruction addresses IA0 and IA1 as an instruction address IA, and supplies to the memory control part MC. The memory control part MC fetches an instruction from the instruction address IA, and supplies it to the instruction supply part IF0 or IF1 as an instruction I. Although the instruction supply parts IF0 and IF1 cannot fetch instructions at the same time, if the number of instructions fetched at a time is set to 2 or more, a bottleneck attributable to the instruction fetch would really occur. The instruction supply part IF0 supplies the instruction multiplexer MX0 and MX1 with the top two instructions out of the fetched instructions as I00 and I01, respectively. Similarly, the instruction supply part IF1 supplies the instruction multiplexer MX0 and MX1 with the top two instructions out of the fetched instructions as I10 and I11, respectively.

The instruction supply part IF1 operates only when two threads are running. When the number of threads increases from 1 to 2, thread generation GT0 from the instruction supply part IF0 to the instruction supply part IF1 and the register scoreboard RS is asserted, and the instruction supply part IF1 is actuated. When the number of threads returns to one, the instruction supply part IF1 asserts an end of thread ETH1 and stops operating.

The instruction multiplexer MX0 selects an instruction from the instructions I00 and I11, and supplies an instruction code MI0 to the instruction decoder DEC0 and register information MR0 to the register scoreboard RS. Similarly, the instruction multiplexer MX1 selects an instruction from the instructions I10 and I01, and supplies an instruction code MI0 to the instruction decoder decoders DEC1 and register information MR1 to the register scoreboard RS.

The instruction decoder DEC0 decodes the instruction code MI0, and supplies control information C0 to the instruction execution part EX0 and register information validity VR0 to the register scoreboard RS. The register information validity VR0 consists of VA0, VB0, V0 and LV0 representing the validity of reading out of RA0 and RB0 and writing into RA0 and RB0, respectively. Similarly, the instruction decoder DEC1 decodes the instruction code MI1, and supplies control information C1 to the instruction execution part EX1 and register information validity VR1 to the register scoreboard RS. The register information validity VR1 consists of VA1, VB1, V1 and LV1 representing the validity of reading out of RA1 and RB1 and writing into RA1 and RB1, respectively.

The register scoreboard RS generates a register module control signal CR and an instruction multiplexer control signal CM from the register information MR0 and MR1, register information validity VR0 and VR1, thread generation GTH0 and end of thread ETH1, and supplies them to the register module RM and the instruction multiplexers MX0 and MX1, respectively.

The register module RM, in accordance with the register module control signal CR, generates input data DRA0 and DRB0 to the instruction execution part EX0 and input data DRA1 and DRB1 to EX1, and supplies them to the instruction execution parts EX0 and EX1, respectively. It also stores computation results DE0 and DE1 from the instruction execution parts EX0 and EX1 and load data DL3 from the memory control part MC.

The instruction execution part EX0, in accordance with the control information C0, processes the input data DRA0 and DRB0, and supplies an execution result DE0 to the memory control part MC and register module RM and an execution result DM0 to the memory control part MC. Similarly, an instruction execution part E1, in accordance with the control information C1, processes the input data DRA1 and DRB1, and supplies an execution result DE1 to the memory control part MC and the register module RM and an execution result DM1 to the memory control part MC.

The memory control part MC, if the instruction processed by the instruction execution part EX0 or EX1 is a memory access instruction, accesses the memory using the execution result DE0 or DE1. At this time, it supplies an address A and loads of stores data D. Further, if the memory access is for loading, it supplies the load data DL3 to the register module RM.

To assimilate the description to the pipeline of FIG. 17, instruction address-related actions of the instruction supply parts IF0 and IF1 match instruction address stages A0 and B1, instruction supply-related actions of the instruction supply parts IF0 and IF1 and actions of the instruction multiplexers MX0 and MX1 to instruction fetch stages I0 and I1, actions of the instruction decoders DEC0 and DEC1 to instruction decode stages D0 and D1, actions of the instruction execution parts EX0 and EX1 to the instruction execution stages E0 and E1, and actions of the memory control part MC to load stages L1, L2 and L3. The register scoreboard RS holds and updates information on the stages of instruction decoding, execution and loading. The register module RM operates when read data are supplied at the instruction decode stages D0 and D1 and when data are written back at the instruction execution stages E0 and E1 and the load stages L3.

Figure 20:
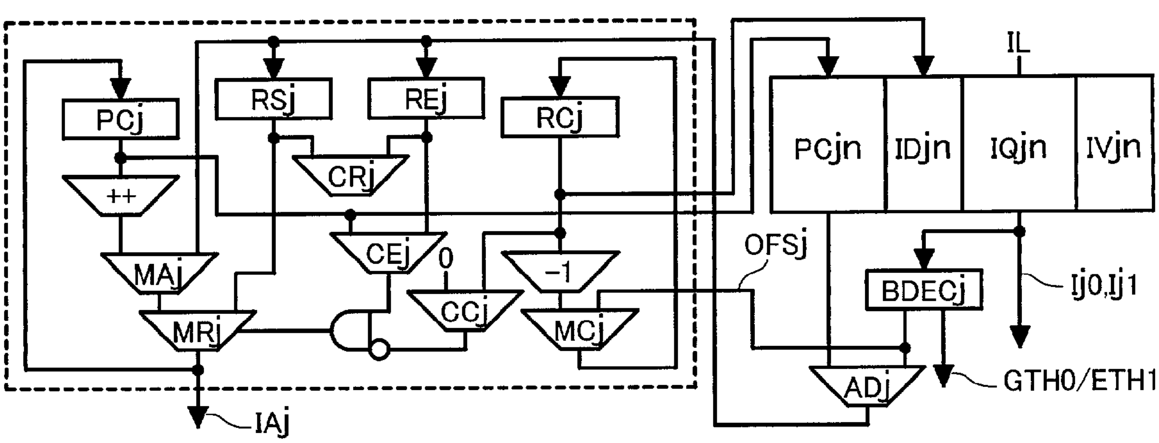
FIG. 20 illustrates an example of instruction supply part.

FIG. 20 illustrates an example of instruction supply part IFj (j=0, 1) of the processor of FIG. 19. During regular operation, a +4 incrementer generates the next program counter PCj+4 from the program counter PCj; multiplexers MXj and MRj selects and supplies it as an instruction address Iaj and also stores into the program counter PCj. By repeating this processing, the instruction address Iaj is incremented by 4 at a time, and requests fetching of a consecutive address instruction. The instruction IL fetched from the instruction address Iaj is stored into an instruction queue Qjn (where n is the entry number). Whenever an instruction is to be stored, PCj and the number of repeats RCj, to be explained later, are stored into the program counter Pcjn and a validity bit Ivjn is asserted.

A branching instruction decoder BDECJ takes out and decodes branching-related instructions (branching, THRDG, THRDE, LDRS, LDRE, LDRC, etc.) from the instruction queue IQJn, and supplies an offset OFSj and the thread generation signal GTH0 or the end of thread ETH1. It then adds the program counter Pcjn and the offset OFSj with an adder Adj.

Where the instruction is a branching instruction or a thread generating instruction THRDG, the instruction address multiplexers MXj and MRj selects the output of the adder ADj as the branching destination address, supplies it to the instruction address Iaj and also stores it into the program counter PCj. They store the instruction IL fetched from the instruction address Iaj into the instruction queue Iqjn if it is a branching instruction or into the instruction queue Iq1*n* of IF1 if it is the thread generating instruction THRDG. The instruction supply part IF0, if the instruction is the thread generating instruction THRDG, further asserts the thread generation GTH0, and actuates the instruction supply part IF1. The instruction supply part IF1, if the instruction is the end of thread instruction ETHRD, asserts the end of thread ETH1 and stops operating.

Figures 1, 2, 3:
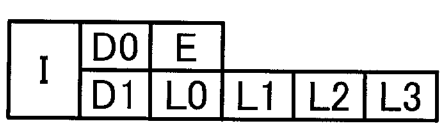
FIG. 1 illustrates a sample program.
FIG. 2 illustrates a repeat control instruction.
FIG. 3 illustrates an example of pipeline of a two-issued superscalar processor.
Figure 4:
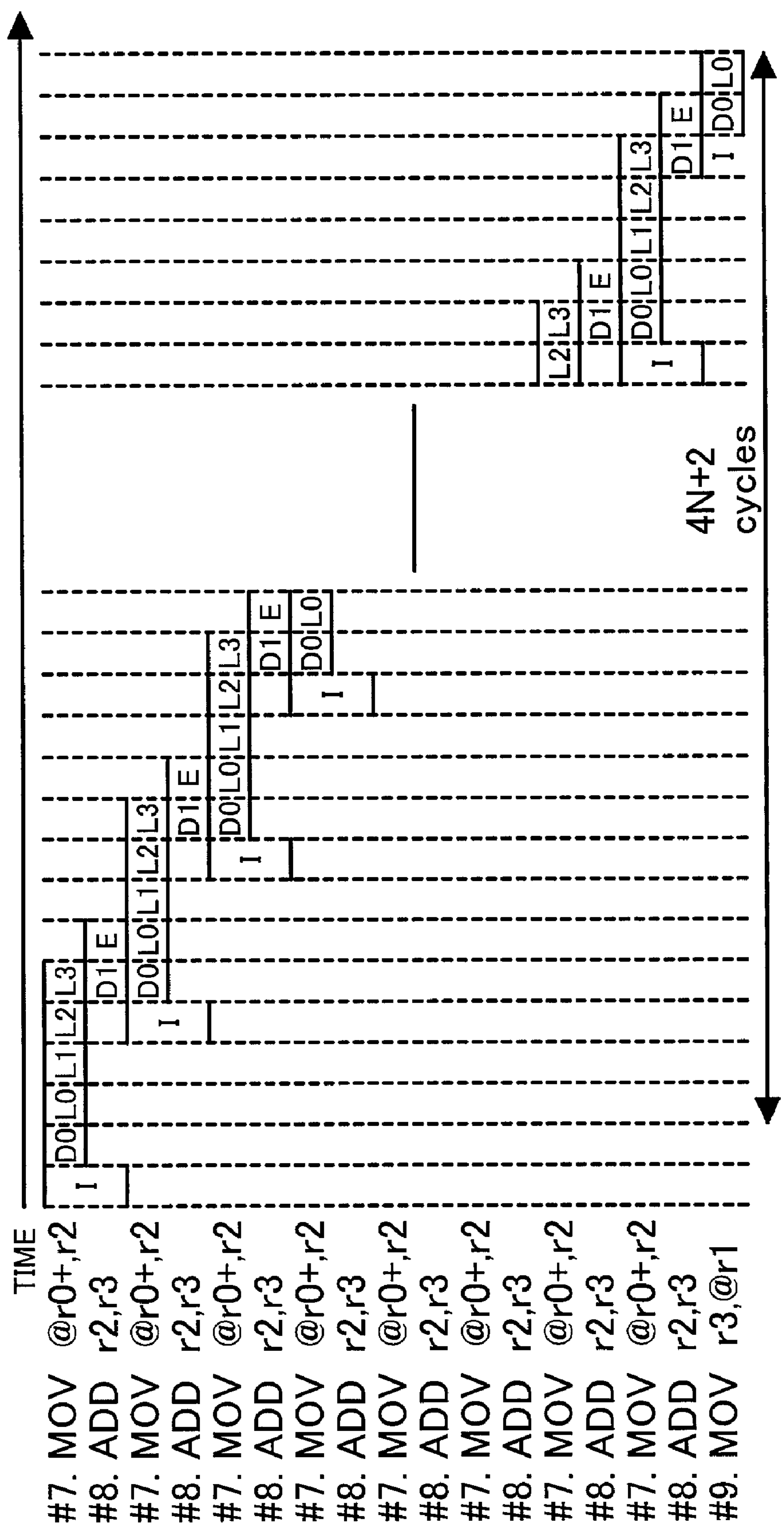
FIG. 4 illustrates a two-issued superscalar pipeline operation of the program of FIG. 1 at a load latency of 4.
Figure 5:
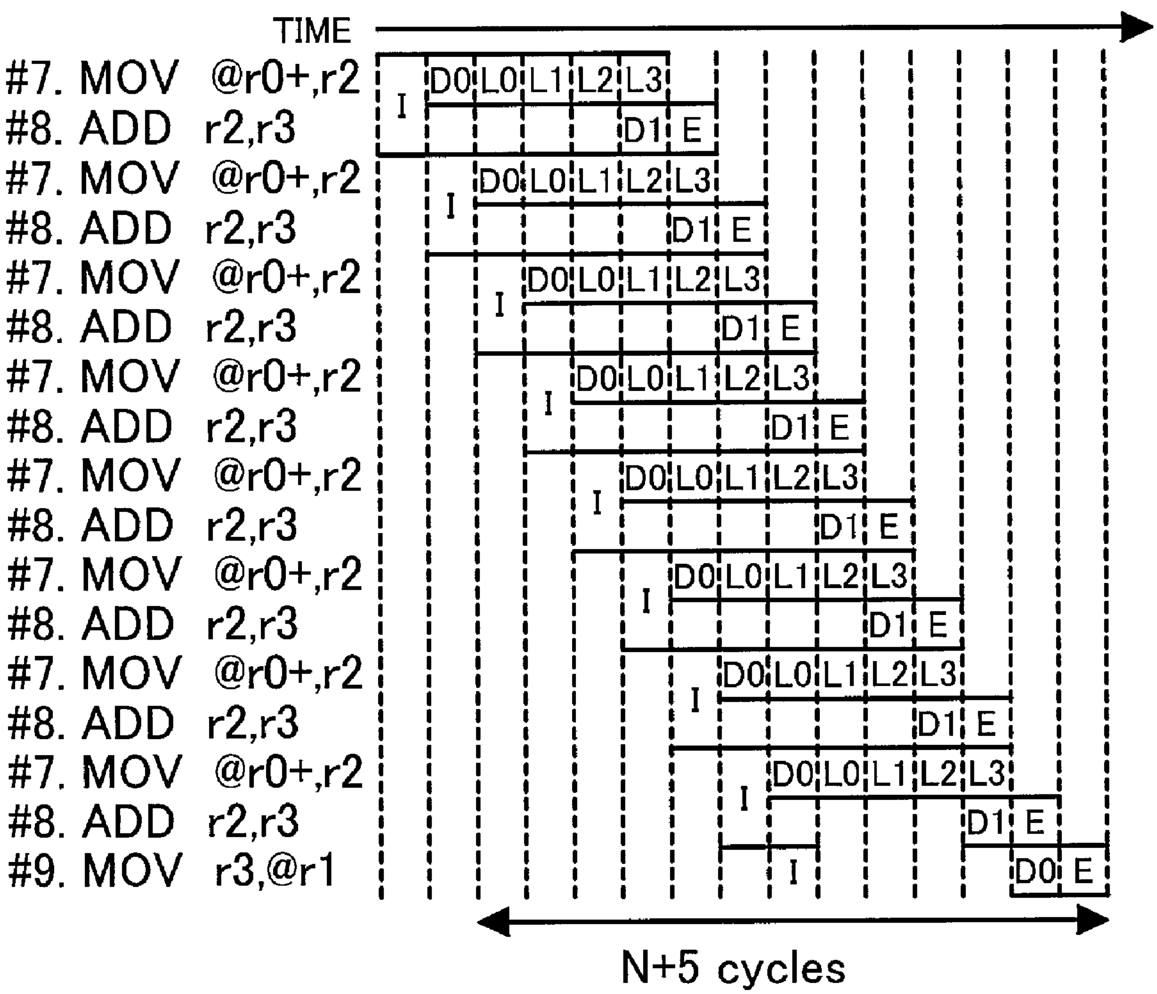
FIG. 5 illustrates a two-issued superscalar out-of-order pipeline operation of the program of FIG. 1 at a load latency of 4.
Figures 7, 8:
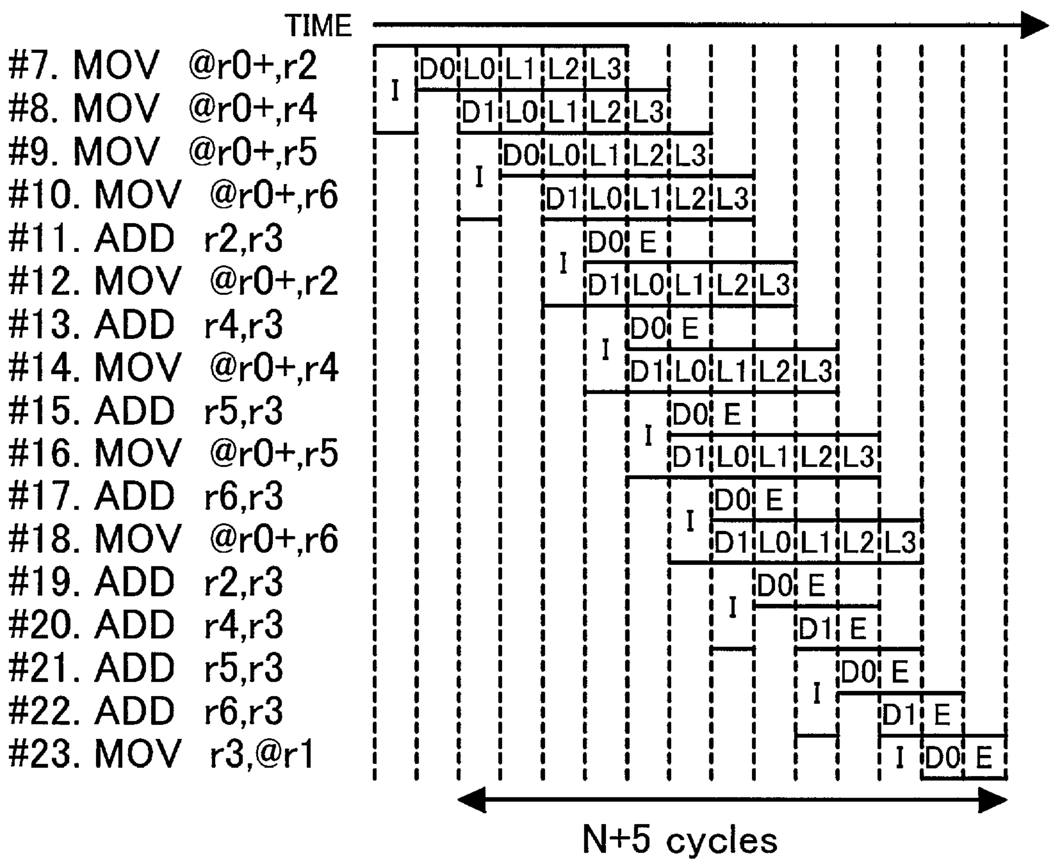
FIG. 7 illustrates a two-issued superscalar pipeline operation of the program of FIG. 6 at a load latency of 4.
FIG. 8 illustrates an example in which the program of FIG. 1 is rewritten for use by a 4-parallel multi-processor of the Merlot system.
Figure 9:
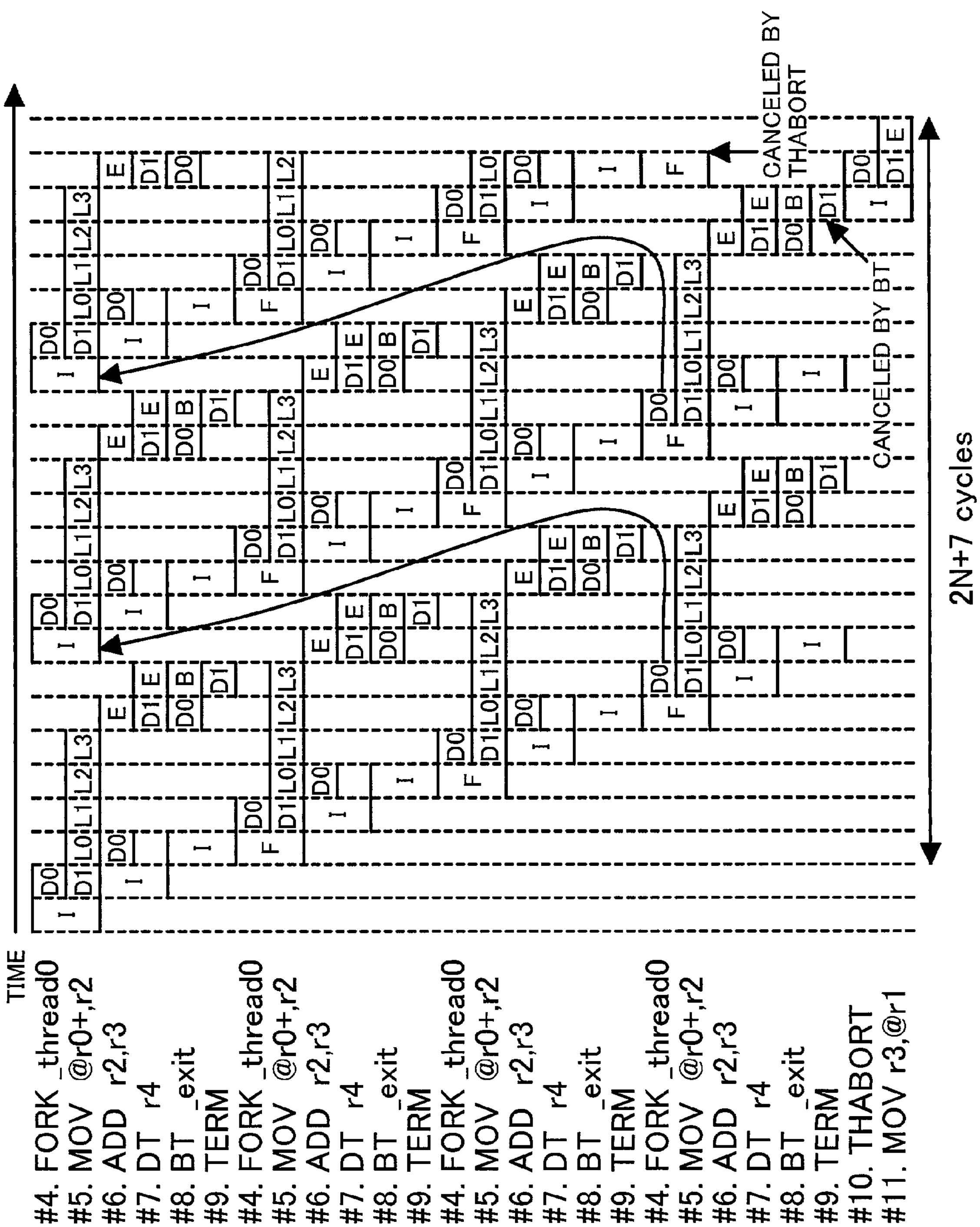
FIG. 9 illustrates the pipeline operation of the program of FIG. 8 at a load latency of 4.
Figure 11:
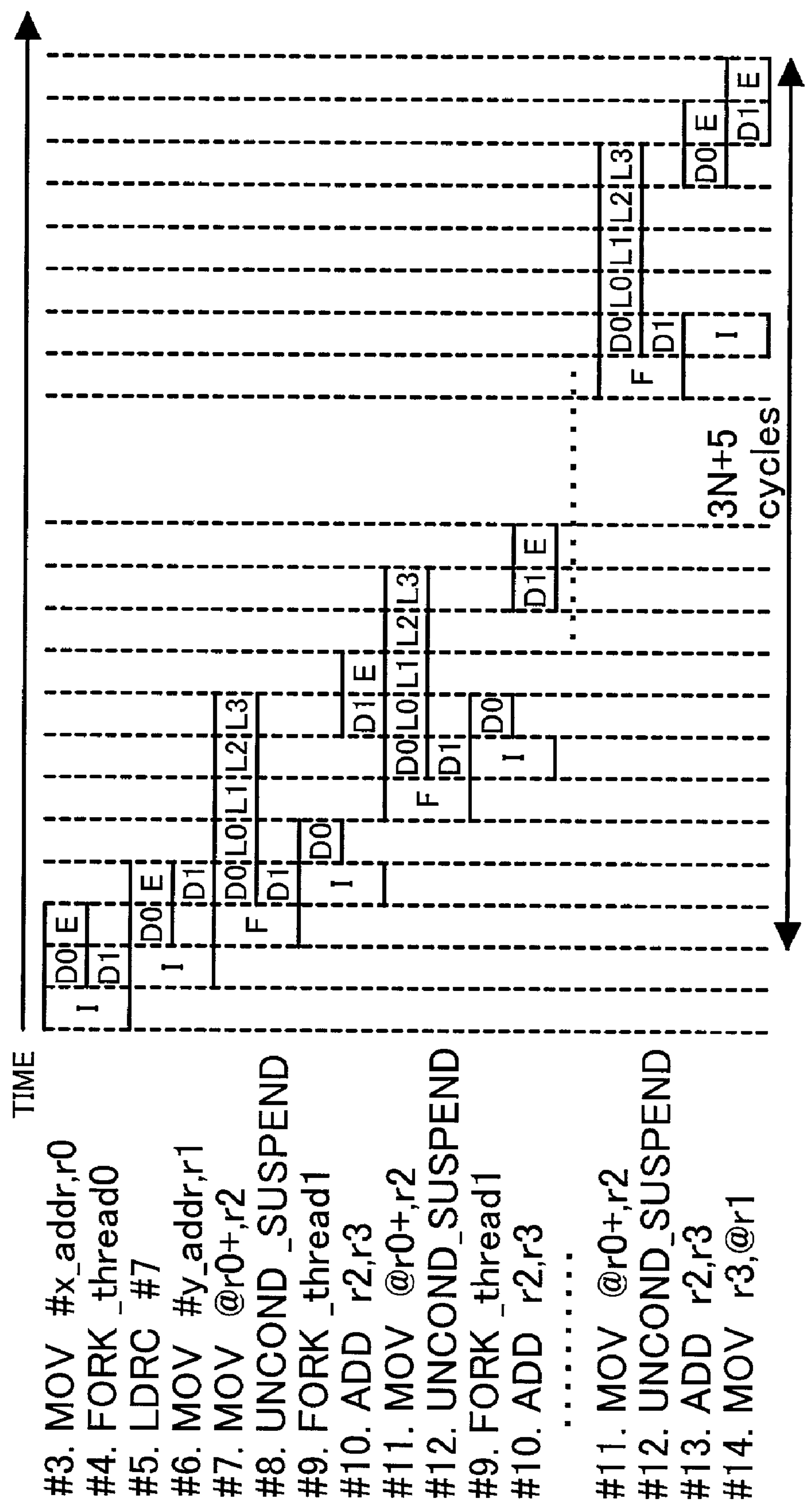
FIG. 11 illustrates the pipeline operation of the program of FIG. 10 at a load latency of 4.
Figure 13:
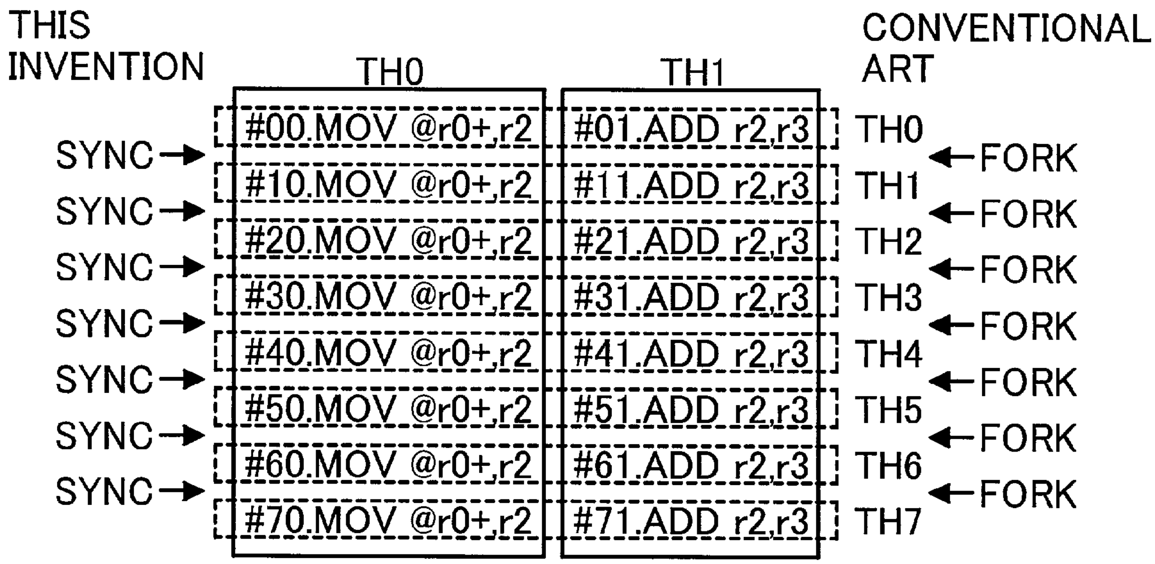
FIG. 13 illustrates thread division systems according to the invention and the prior art.
Figure 14:
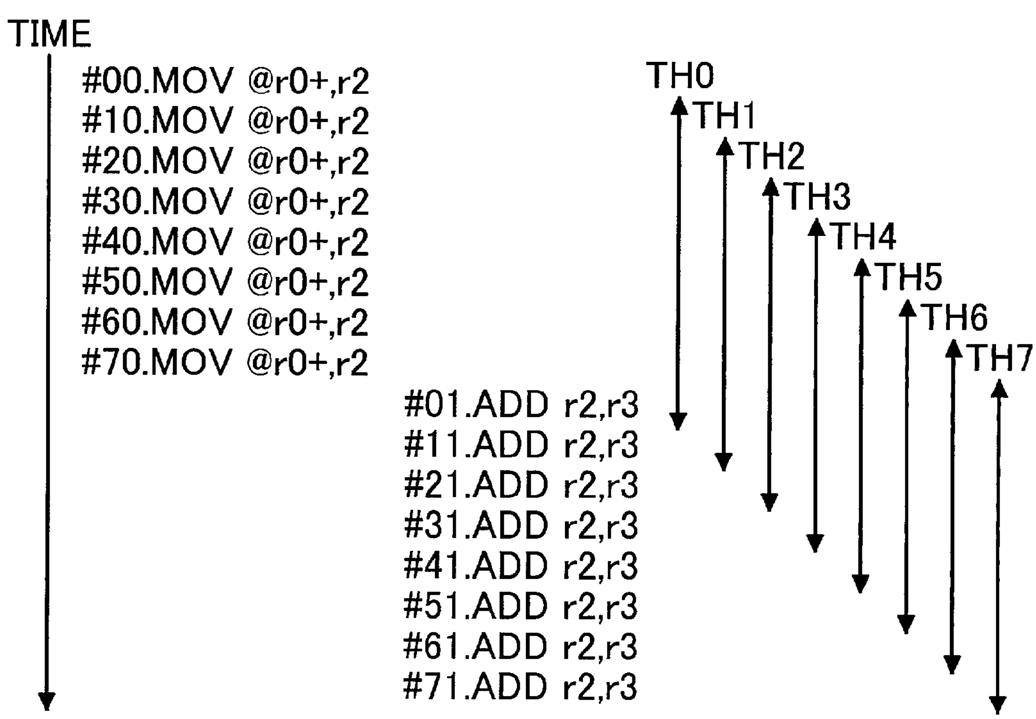
FIG. 14 illustrates thread execution according to the prior art at a load latency of 8.

If the instruction is the LDRS instruction of FIG. 2, the output of the adder ADj is stored into a repeat start address RSj. If the instruction is the LDRE instruction of FIG. 2, the output of the adder ADj is stored into a repeat end address Rej. If the instruction is the LDRC instruction of FIG. 2, the offset OFSj is selected by a number-of-repeats multiplexer MCj as the number of repeats and stored into the number of repeats RCj. The number of repeats shall be not less than one, and even if 0 is specified, the repeat will be skipped after one repeat is executed. At the same time, the repeat start address RSj and the repeat end address REj are compared by a repeated instruction number comparator CRj. If they are found identical, this means that 1 instruction is repeated, and therefore that 1 instruction continues to be held in the instruction queue IQjn to deter the instruction from being fetched.

When the repeat mechanism is not used, the number of repeats RCj is set to zero. At this time, other bits than the least significant of the number of repeats RCj are entered into a number of times comparator CCj and compared with zero. As the result of comparison is identity with zero, the output of an end of repeat detecting comparator CEj is masked by an AND gate, and the instruction address multiplexer MRj selects the output of the instruction address multiplexer MXj without relying on the input PCj to the end of repeat detecting comparator CEj and the value of Rej, with no repeat processing carried out.

When addresses are stored into the repeat start address RSj and the repeat end address REj and a value of 2 or above is stored into the number of repeats RCj, the repeat mechanism is actuated. The program counter PCj and the end of repeat address Rej are compared by the end of repeat detecting comparator CEj all the time, and an identify signal is supplied to the AND gate. When the program counter PCj and the repeat end address REj become identical, the identify signal takes on a value of 1. If then the number of repeats RCj is not less than 2, as the output of the end of repeat detecting comparator CEj becomes 0, the output of the AND gate becomes 1, and the instruction address multiplexer MRj selects the repeat start address RSj, supplying it as the instruction address Iaj. As a result, the instruction fetch returns to the repeat start address. At the same time as the action stated above, the number of repeats RCj is decremented, and the result is selected by the number-of-repeats multiplexer MCj to become an input to the number of repeats RCj. The number of repeats RCj is updated unless the program counter PCj and the repeat end address REj are identical and the number of repeats RCj is zero. In the instruction queue Iqjn, the number of repeats RCj matching each instruction in the queue is assigned as a thread synchronization number IDjn. When the number of repeats RCj becomes one, the output of the number of times comparator CCj becomes one with the result that repeat processing no longer takes place and the number of repeats RCj is updated to zero to end the operation. In the case of 1 instruction repeat, the instruction continues to be held in the instruction queue Iqjn, and only the thread synchronization number IDjn is updated. At the time of the end of repeat, the process returns to the usual instruction queue Iqnj operation.

Incidentally, it is also possible use less significant bits of the number of repeats RCj as the thread synchronization number Idjn. In this case, if the data defining thread is too far ahead, the thread synchronization numbers ID0*n* and ID1*m* (where m is the entry number) may become identical in spite of the difference between the numbers of repeats RC0 and RC1. In such a case, the data defining thread is deterred from instruction fetching. Thus, if the thread synchronization numbers ID0*n* and ID1*m* are identical and the numbers of repeats RC0 and RC1 are different, IF0 performs no instruction fetching.

FIG. 21 illustrates an example of instruction multiplexer Mj (j=0, 1) of the processor of FIG. 19. The instruction Ix (x=j0, k1, j) consists of an operation code OPx, register fields RAx and RBx, a thread synchronization number IDx and an instruction validity IVx. The instruction multiplexer Mj selects out of two instructions Ij0 and Ik1 ({j, k}={0, 1}, {1, 0}) the instruction Ij0 if the instruction Ij0 is executable or, if not, the instruction Ik1 as the instruction Ij. Then it supplies the selected thread as a thread number THj. Thus, if the instruction Ij0 is selected, THj=j, or if the instruction Ik1 is selected, THj=k. Of the constituent elements of the instruction Ij, the operation code OPj and the instruction validity IVj are supplied to the instruction decoders DECj as the instruction code Mij, the register fields RAj and RBj, the thread synchronization number IDj and thread number THj are supplied to the register scoreboard RS as the register information MRj.

Executability is judged according to data dependency on the instruction under prior execution. In a pipeline configuration of 4 in load latency as shown in FIG. 17, execution may be made impossible by flow dependency on three prior instructions. THj generating logic illustrated in FIG. 21 carries out determination of this flow dependency and determination of the validity of instructions. This logic similar to the register scoreboard RS to be explained later. It receives scoreboard information CM from the register scoreboard RS and performs determination. First, it is checked with an instruction code OPj0 whether or not the register fields RAj0 and RBj0 are to be used for reading out of registers, read validities MVAj and MVBj are generated. Read RA and read RB are functions for this purpose, and if the code allocation for instructions is regular, high speed determination is possible by merely checking part of the instruction code OPj0. Further, in order to unify the formula, out of write-back possible Ry (y=L, L0, L1), RL which essentially does not exist is defined to be RL=0. Flow dependency detection MFjy then is as shown in FIG. 21. Flow dependency arises if valid read and write register numbers are identical when writing back into the same thread, same thread synchronization number or same register file is possible. If no flow dependency arises and the instruction is valid, selection validity MVj is asserted, and Ij and THj are selected on the basis of that MVj. Further, the THj generating logic ensures that the data using thread may not pass the data defining thread. This is achieved by so arranging that THj be equal to 0 when thread synchronization numbers IDj0 and IDk1 are identical. Thus, when the thread synchronization numbers are identical, the data defining thread is selected. Incidentally, since the determination of data dependency takes time, where the fetch instruction from the memory control part MC is not latched into the instruction queue IQjn and directly supplied to the instruction multiplexer Mj, no determination of data dependency is performed, the instruction is supplied in anticipation of executability. Usually, what is directly supplied is the top instruction of a branching destination and accordingly is likely to be executable.

By the above-described selection method, instructions are selected according to the executability of the instructions I00 and I10 as shown in FIG. 22. In the case of #1, the instructions I00 and I10 are selected, and both are executable. In the case of #2, as the instruction I10 is inexecutable, the instruction I11 is also inexecutable. On the other hand, out of the selected instructions I100 and I01, I00 is executable and the executability of I01 is unknown. Thus, an instruction or instructions which are known to be or may be executable are selected, but no inexecutable instruction is selected. The same is true of #3. In the case of #4, since both instructions I00 and I10 are inexecutable, all the four instructions are inexecutable, whichever instruction that may be selected is not executed.

Figures 23, 24:
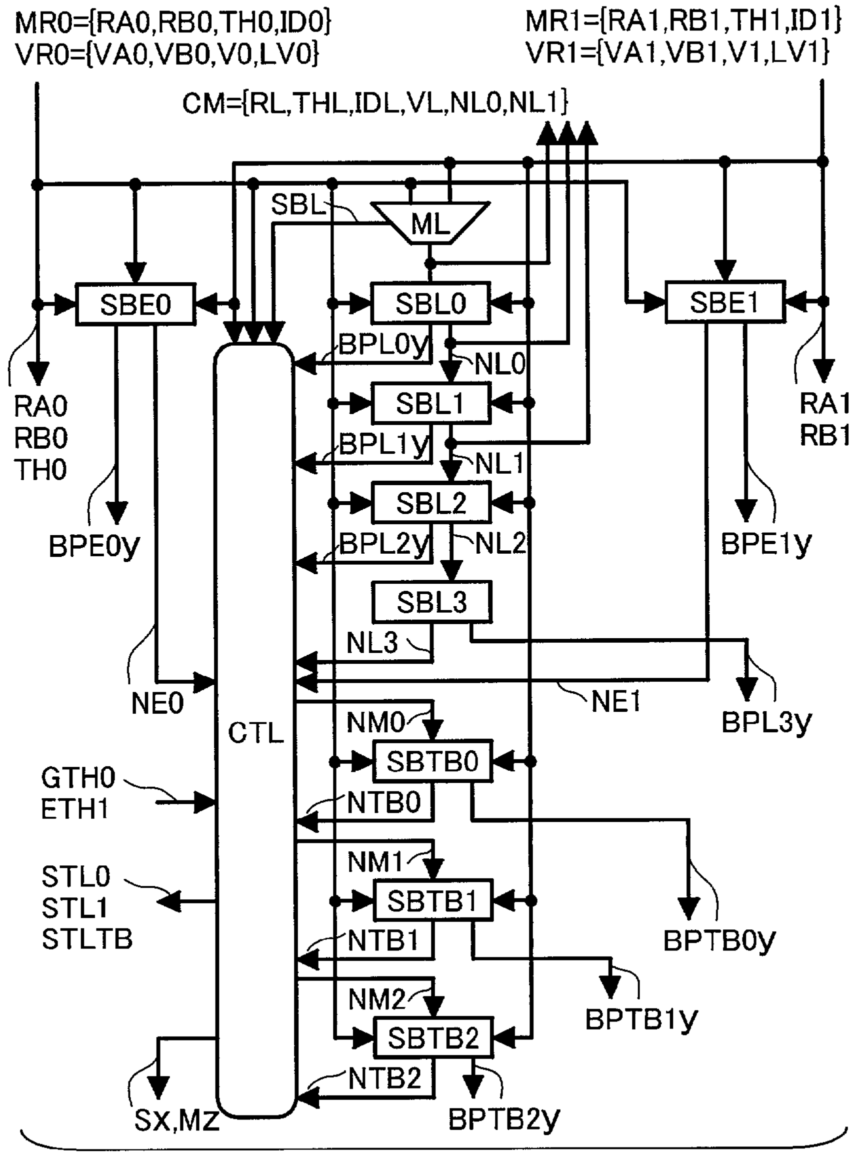
FIG. 23 illustrates an example of register scoreboard configuration.
FIG. 24 illustrates an example of load-based cell input multiplexer.

FIG. 23 illustrates an example of register scoreboard RS. As in the conventional processor, write information into a register file matching the pipeline stage is held and compared with new read information to detect three kinds of dependency regarding registers, including flow dependency, reverse dependency and output dependency. Also, write information into a register file, which is temporarily deterred by reverse dependency or output dependency is held and compared with new read information to detect the three aforementioned kinds of dependency. Further, whether or not writing is possible according to reverse dependency or output dependency is determined, and a write instruction is given. Details will be described below.

Cells SBL0 which are not at the top of scoreboard hold load data write information RL selected by a multiplexer ML out of the register information MR0 or MR1 as control information for the load stage L0, and generate and supply bypass control information BPL0*y* (y=RA0, RB0, RA1, RB1) and next stage control information NL0 from the held data and the register information MR0 and MR1. Similarly, cells SBE0 and SBE1 which are at the top of scoreboard hold the register information MR0 and MR1 as control information for the execution stages E0 and E1, respectively, and generate and supply bypass control information BPE0*y* and BPE1*y* and next stage control information NE0 and NE1 from the held data and the register information MR0 and MR1. Also, cells SBL1, SBL2 and SBL3 which are not at the top of scoreboard hold next stage control information NL0, NL1 and NL2 as control information for the load stages L1, L2 and L3, and generate and supply bypass control information BPL1*y*, BPL2*y* and BPL3*y* and next stage control information NL1, NL2 and NL3 from the held data and the register information MR and MR1. Further, cells SBTB0, SBTB1 and SBTB2 which are not at the top of scoreboard hold temporary buffer control information NM0, NM1 and NM2 selected by the scoreboard control part CTL as temporary buffer control information, and generate and supply bypass control information BPTB0*y*, BPTB1*y* and BPTB2*y* and next cycle control information NTB0, NTB1 and NTB2 from the held data and the register information MR0 and MR1. Also, the scoreboard control part CTL performs detects any stall according to flow dependency and temporarily buffer fullness and controls writing into the register file RF and a temporary buffer TB. Further, it supplies input signals for scoreboard cells SBL0, SBL1 and SBL2 to the instruction multiplexers MX0 and MX1 as scoreboard information CM={RL, THL, IDL, VL, NL0, NL1}.

Details of the multiplexer ML, cells SBL0, SBE0 and SBE1 which are at the top of scoreboard, cells SBL1, SBL2, SBL3, SBTB0, SBTB1 and SBTB2 which are not at the top of scoreboard, and the scoreboard control part CTL will be described below with reference to FIG. 24 through FIG. 27.

FIG. 24 illustrates an example of multiplexer ML. Write information on load instructions is selected from the register information MR0 or MR1. If both are load instructions, information on the prior instruction is selected. If neither is a load instruction, either can be selected. Therefore, if the prior instruction is a load instruction, its register information or, if it is not a load instruction, the other register information is selected. As stated above, the register information MRj (j=0, 1) consists of register fields Raj and RBj, a thread synchronization number IDj and a thread number THj. As will be explained later, if the thread number TH0 is 0, the instruction I0 is the prior instruction, or if the thread number TH0 is 1, the instruction I1 is. As the first term in the equation of selecting condition for the register information MR0 given in FIG. 24 is TH0=0 and the write signal LV0 being asserted, the instruction I0 is the prior instruction and a load instruction. On the other hand, as the second term is TH0= 1 and the write signal LV1 being negated, the instruction I1 is the prior instruction and a non-load instruction. A load pipe SBL indicating which has been selected is supplied to the scoreboard control part CTL. As stated in the description of the multiplexer ML, if the thread number TH0 is 0, the instruction I0 is the prior instruction, or if the thread number TH0 is 1, the instruction I1 is. At the time of stall, as the instruction is not executed, the write validity VL is invalidated with a stall signal STL0 or STL1.

If the thread number TH0 is 0, the combination of instructions selected by the instruction multiplexer MX0 is either #1 or #2 in FIG. 22. If it is #1, the instruction I0 is the instruction I00 of the data defining thread supplied from the instruction supply part IF0, and the instruction I1 is the instruction I10 of the data using thread supplied from the instruction supply part IF1. Therefore, if the instruction I00 is executed earlier than the instruction I10, it does not violate the execution order rule for data defining threads and data using threads according to the present invention. If it is #2, the instructions I0 and I1 is the instructions I00 and I01, and I0 is prior in the order of serial execution. On the other hand, if the thread number TH0 is 1, the combination of instructions selected by the instruction multiplexer MX0 is either #3 or #4 in FIG. 22. If it is #3, the instructions I0 and I1 is the instructions I11 and I10, and I1 is prior in the order of serial execution. If it is #4, both the instructions I0 and I1 are inexecutable. From the foregoing, if the thread number TH0 is 0, the instruction I0 is the prior instruction, or if the thread number TH0 is 1, the instruction I1 is.

Figure 25:
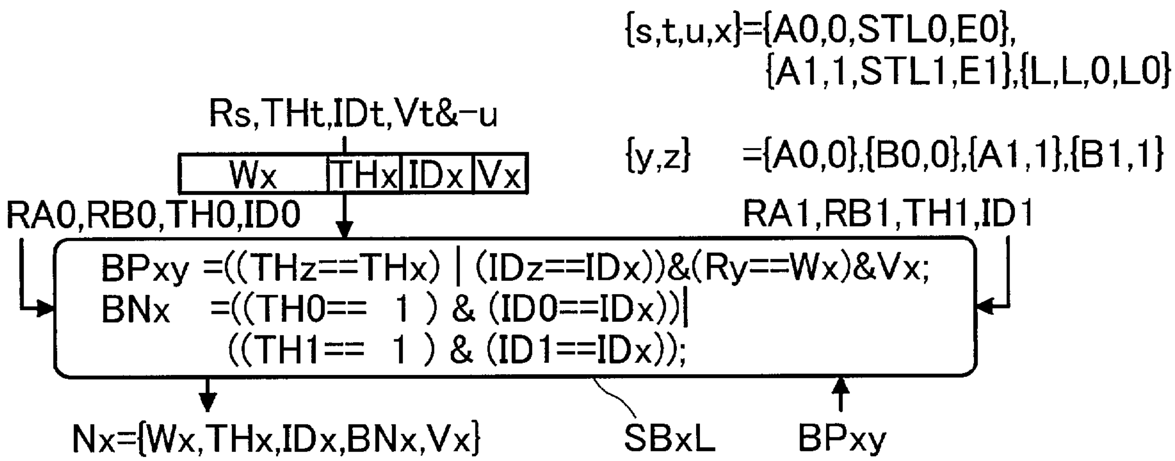
FIG. 25 illustrates an example of top cell in the scoreboard.

FIG. 25 illustrates an example of top cell SBx (x=L0, E0, E1) in the scoreboard. Inputs Rs, THt, IDt and Vt&~u ({s, t, u}={L, L, 1}, {A0, 0, STL0}, {A1, 1, STL1}) are held as a write register number Wx, a write thread number THx, a write thread synchronization number IDx and a write validity Vx, which constitute x stage write information, and bypass control information BPxy (y=RA0, RB0, RA1, RB1) and next stage write control information Nx={Wx, THx, IDx, BNx, Vx} are generated and supplied from these inputs and the register information MR0 and MR1, register write signals V0 and L0, and V1 and L1. Masking of the input Vt with u is to invalidate write information because no instruction is executed at the time of stall.

The first equation of the logical part SBxL of FIG. 25 is the defining equation for the bypass control information BPxy. The bypass control information BPxy is asserted when writing at the x stage is valid, the write register number Wx and the register read number y are identical, and writing and reading have the same thread number or the same thread synchronization number. If they have the same thread number, it means bypass control within the thread, which is commonly accomplished in conventional processors as well. On the other hand, if they have the same thread synchronization number, it means bypass control from a data defining thread to a data using thread. The absence of bypass control in the reverse direction, i.e. from a data using thread to a data defining thread, is due to the configuration of the instruction multiplexer Mj which does not permit the data using thread to pass the data defining thread.

Out of the elements of the next stage write control information Nx, the held information of the write register number Wx, write thread number THx, write thread synchronization number IDx and write validity Vx is supplied as it is. Write back BNx indicates that reverse dependency and output dependency have been eliminate, making possible writing back into the register file. In this embodiment, if the thread synchronization number of the data using thread is identical with the thread synchronization number of the write control information, assertion is done and continued until writing back is achieved. The second equation of the logical part SBxL of FIG. 25 is the defining equation for the write back BNx.

Figure 26:
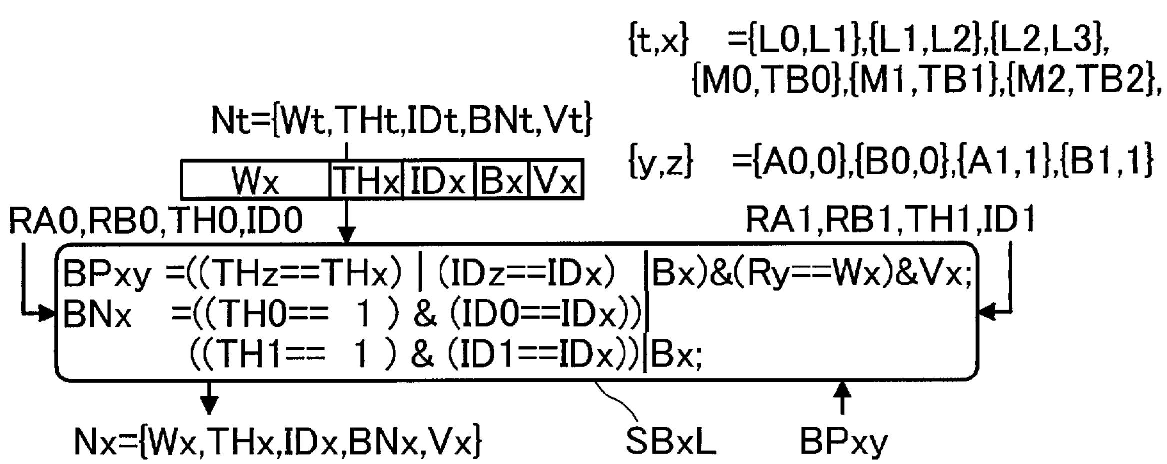
FIG. 26 illustrates an example of non-top cell in the scoreboard.

FIG. 26 illustrates an example of cell SBx (x=L1, L2, L3, TB0, TB1, TB2) which is not at the top of scoreboard. Input signals Wt, THt, IDt, BNt and Vt (t=L0, L1, L2, M0, M1, M2) are held as a write register number Wx, write thread number THx, write thread synchronization number IDx, write back Bx and write validity Vx, which constitute x stage write information, and bypass control information BPxy (y=RA0, RB0, RA1, RB1) and next stage write control information Nx={Wx, THx, IDx, BNx, Vx} are generated and supplied from these inputs and the register information MR0 and MR1, register write signals V0 and L0, and V1 and L1.

The first equation of the logical part SBxL of FIG. 26 is the defining equation for the bypass control information BPxy. The bypass control information BPxy is asserted when writing at the x stage is valid, the write register number Wx and the register read number y are identical, and writing and reading have the same thread number and the same thread synchronization number or write back is being asserted. The difference from what is shown in FIG. 25 consists in the addition of the condition of write back Bx being asserted. According to this condition, data not yet written back are supplied on a bypass basis in place of the register value. The second equation of the logical part SBxL of FIG. 26 is the defining equation for the write back BNx. The difference from FIG. 25 consists in the addition of the condition of write back Bx being asserted. According to this condition, the write back Bx, once asserted, continues to be asserted until it is written back.

FIG. 27 shows an example of scoreboard control logic CTL in FIG. 23. Any stall due to flow dependency is detected in the following manner. As the load latency is 4, data matching the write control information NLz (z=0, 1, 2) are not yet valid. Therefore, if the bypass control BPzy (y=A0, A1, B0, B1) is asserted, bypassing of invalid data is required, which cannot be realized. Accordingly, if any such signal is asserted, it is necessary to have the execution start of any instruction using the bypass data wait until the data become valid. For this reason stall signals STL0 and STL1 in which bypass control BPzy is collected are supplied. On this occasion, the bypass control BPzy is masked with read validities VA0, VB0, VA and VB1 out of the register information validities VR0 and VR1. Further, as the prior instruction is stalled, the posterior instruction is also stalled to maintain the order of serial execution. As stated in the description of the multiplexer ML, if the thread number TH0 is 0, the instruction I0 is the prior instruction, or if the thread number TH0 is 1, the instruction I1 is. Or, if both prior and posterior instructions are data load instructions, the posterior instruction is stalled. If the pipe not selected by the multiplexer ML, i.e. the pipe not indicated by the load pipe SBLm and the write validity LV0 or LV1 to the write register RB0 or RB1 for data loading are asserted, stalling is carried out. From the foregoing, stall signals STL0 and STL1 are defined by the first through fourth equations of FIG. 27. An individual thread STH is negated during the period from the thread generation GTH0 until the end of thread ETH1. Therefore its generation formula takes on the form of the fifth equation of FIG. 27.

The write data are validated upon the end of the pipeline stage E0, E1 or L3. The matching write information of the register scoreboard RS is NE0, NE1 or NL3. The data held in the temporary buffer are also valid. Valid data are written back into the register file RF as soon as reverse dependency or output dependency is eliminated. As a thread number THx (x=E0=E1= L3=TB0, TB1, TB2) of 1 means a data using thread, neither reverse dependency nor output dependency arises, and valid data can be written at any time. On the other hand, if the thread number THx is 0, the data can be written back when the reverse dependency or output dependency is eliminated and write back Bx is asserted. Further, while an individual thread STH is being asserted, neither reverse dependency nor output dependency arises. From the foregoing, a write indication Sx takes on the form of the sixth equation of FIG. 27. Where valid data are prevent by either reverse dependency or output dependency from being written, a temporary buffer control Cx is asserted to write into the temporary buffer TB. The temporary buffer control Cx takes on the form of the seventh equation of FIG. 27. As the temporary buffer TB has three entries, if four or more of the six temporary buffer controls Cx are asserted, writing into the temporary buffer TB is impossible. In this case, the stall signal STLTB attributable to the temporary buffer is asserted to stop the progress of the pipeline. If no more than three are asserted, writing is possible. Since writing into the temporary buffer TB is done only from a data defining thread, the data written into it are in the order of serial execution. The positions in this order are always TB2, TB1 and TB0 from the earliest onward, and write data into the temporary buffer TB are selected so that TB0 is selected where one entry in the temporary buffer TB is to be used, or TB0 and TB1 are selected where two entries are to be used. Generation of data selections M0, M1 and M2 according to this principle would result in the table of FIG. 27. Incidentally, positions in the order of serial execution including write data from the pipeline stage E0, E1 or L3 are TB2, TB1, TB0, L3, E0 and E1 from the earliest onward. Then according to the data selections M0, M1 and M2, the next stage write control information Nt (t=M0, M1, M2) is selected from Nx. The final three equations of FIG. 27 are the selection formulas.

Figure 28:
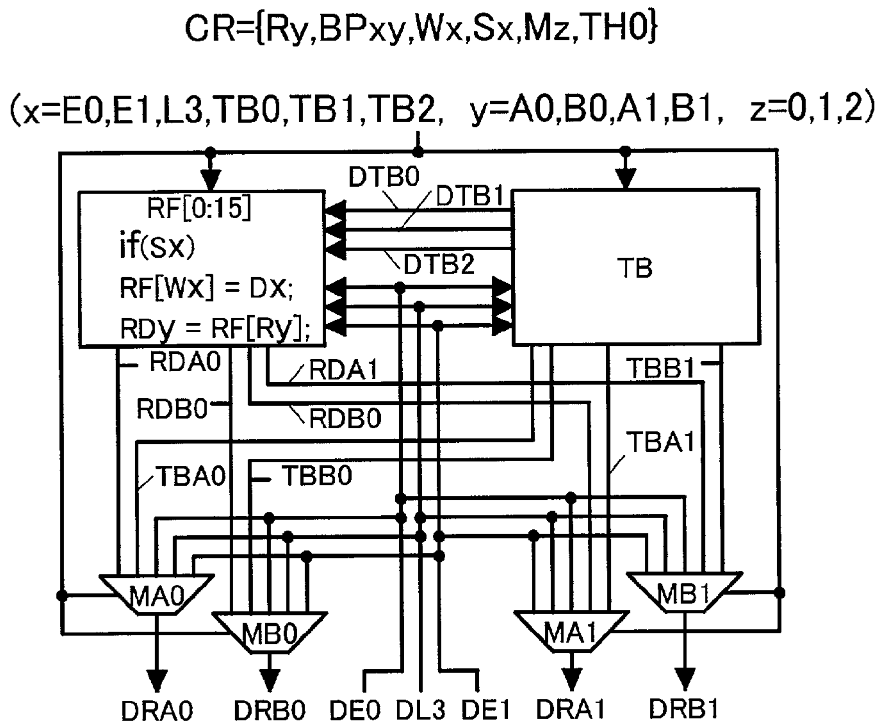
FIG. 28 illustrates an example of register module.

FIG. 28 illustrates an example of register module RM of the processor shown in FIG. 19. It consists of the register file RF, a temporary buffer TB and a read data multiplexer My (y=A0, A1, B0, B1). It has the register control signal CR and output data DE0, DE1 and DL3 as its inputs and read data DRy (y=A0, A1, B0, B1) as its output. The register control signal CR consists of a register read number Ry, bypass control BPxy (x=E0, E1, L3, TB0, TB1, TB2), register write number Wx, register write control signal Sx, temporary buffer write data selection Mz (z=0, 1, 2) and thread number TH0.

The register file RF has 16 entries, 4 reads and 6 writes. When the write control signal Sx is asserted, data Dx are written into No. Wx of the register file RF. Also, No. Ry of the register file RF is read as register read data RDy.

Figure 29:
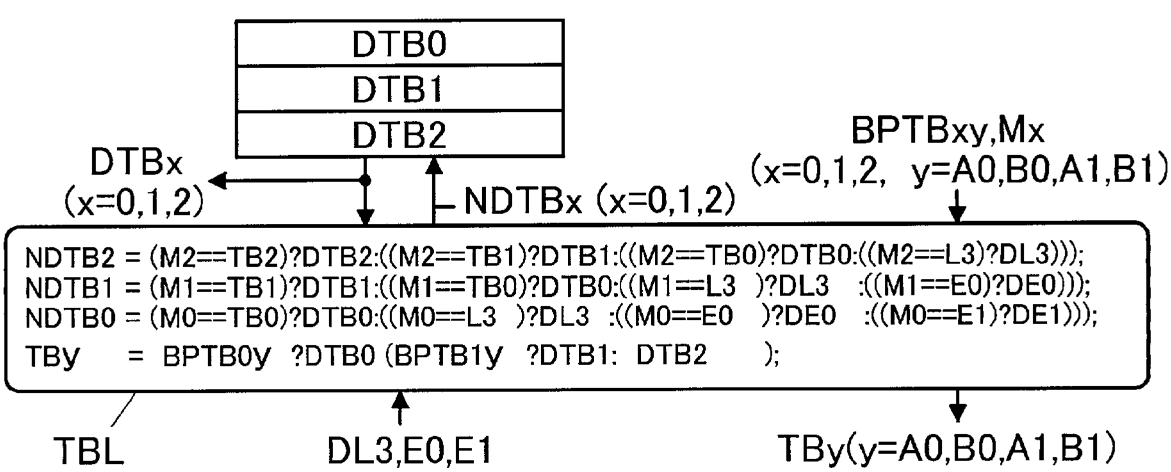
FIG. 29 illustrates an example of temporary buffer.

The temporary buffer TB, having a bypass control BPTBzy, data selection Mz and output data DE0, DE1 and DL3 as its inputs, supplies temporary buffer hold data DTBz and temporary buffer read data TBy as its outputs. It also updates the hold data DTBz in accordance with the write data selection signal Mz. Details will be described with reference to FIG. 29. The temporary buffer hold data DTBz are constantly supplied. The selection logic for the write data DNTBZ is expressed in the first three equations of the temporary buffer multiplexer TBM. The selection is done according to the selection signal Mz. The selection logic for the read data TBy is expressed in the final equation of the temporary buffer multiplexer TBM. The selection is done according to the bypass control BPTBzy.

Incidentally, when a plurality of bypass controls BPzy are asserted, the latest data are selected. Namely, the last in the order of serial execution is selected.

Figure 30:
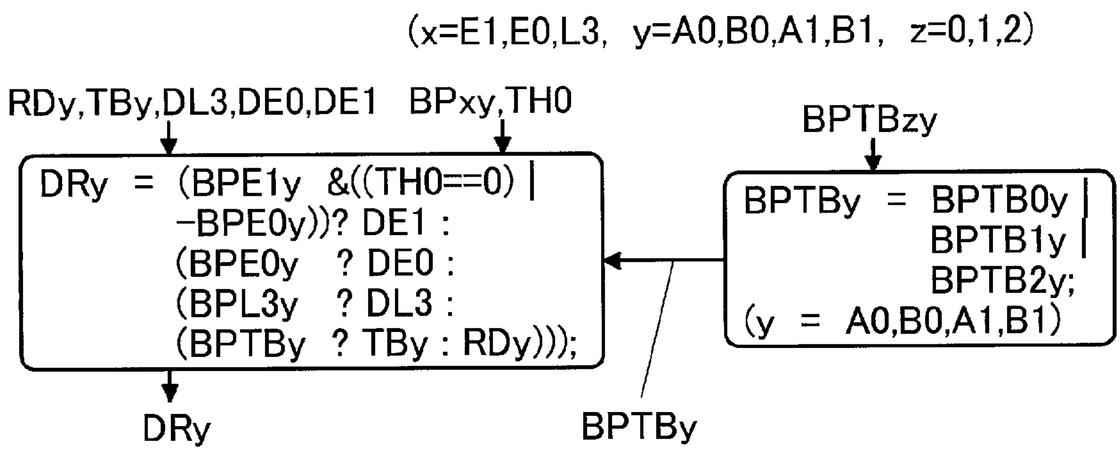
FIG. 30 illustrate an example of bypass multiplexer.

The read data multiplexer My has the bypass control BPxy, thread number TH0, register read data RDy, temporary buffer read data TBy and output data DE0, DE1 and DL3 as its inputs and supplies read data DRy (y=A0, A1, B0, B1) as its output. Details will be described with reference to FIG. 30. Even when a plurality of bypass controls BPxy are asserted, it selects the latest data. Between the output data DE0 and DE1, DE1 is newer if the thread number TH0 is 0, or DE0 is newer if it is 1. As a result, the selection logic is as stated in the frame on the left hand side of FIG. 30. The temporary buffer bypass control BPTBy then is the logical sum of three bypass controls BPTBzy as in the logic expressed in the frame on the right hand side of FIG. 30.

Now, actual execution of the program of FIG. 16 by this embodiment of the invention would consist of the following actions. First at a point of time t0, the instruction address stage A0 of the instructions #1 and #2 is implemented. The instruction supply part IF0 places the address of the instruction #1 over the instruction address IA0, and issues a fetch request to the memory control part MC. At the same time, it latches the instruction address IA0 to the program counter PC0. Then, the instruction address multiplexer MIA selects IA0 as IA, and supplies it to the memory control part MC.

At the next cycle time t1, the instruction address stage A0 of the instructions #3 and #4 is implemented. To the program counter PC0 is added 4, the result being placed over the instruction address IA0 and supplied to the memory control part MC via the multiplexer MIA, and a fetch request is issued. At the same time, the instruction address IA0 is latched to the program counter PC0. Further, the instruction fetch stage I0 of the instructions #1 and #2 is implemented. The memory supply part MC fetches two instructions, i.e. the instructions #1 and #2, from the address of the instruction #1, and supplies them to the instruction supply part IF0 as the fetch instruction IL. The instruction supply part IF0 stores them into the instruction queue IQ0*n* and, at the same time, supplies them to the instruction multiplexer MX0 and MX1 as the instructions I00 and I01. As the repeat counter RC0 then is at 0, the count indicating the non-use of the repeat mechanism, 0 is assigned as the thread synchronization numbers ID00 and ID01. The instruction multiplexers MX0 and MX1 respectively select instructions I00 and I01, generate the instruction codes MI0 and MI1 and the register information MR0 and MR1, and supply them to the instruction decoders DEC0 and DEC1 and the register scoreboard RS. Thus, the instructions #1 and #2 are supplied to the pipe 0 and the pipe 1, respectively. Incidentally, though the instruction #1 is a branching-related instruction, as its supply immediately after an instruction fetch is before the analysis by the branching-related instruction decoder BDEC0, it is supplied to the instruction decoder DEC0, which turns the processing into a no-operation (NOP).

At the point of time t2, the instruction address stage A0 of the instructions #5, #6 and #9 is implemented. First, 4 is added to the program counter PC0 of the instruction supply part IF0 for updating, and a request to fetch the instructions #5 and #6 is issued. As the instruction #9 is a repeat start and end instruction, repeat setup is accomplished with the instructions #1, #3, and #5. The branching-related instruction decoder BDEC0 decodes the LDRE instruction of the instruction #1, adds an offset OFS0 to the program counter PC0 and the instruction #9 to generate the address of the instruction #9, and stores it at the end of repeat address RE0. As at the point of time t1, the instruction fetch stage 10 of the instructions #3 and #4 is implemented. Further, as the actions of the instruction decode stages D0 and D1 of the instructions #1 and #2, the following is performed. As the instruction #1 is a branching-related instruction, the instruction decoder DEC0 turns the processing into an NOP. The instruction decoder DEC1 decodes the instruction #2 to supply the control information C1, and further supplies the register information validity VR1. The instruction #2 is an instruction to store a constant x_addr at r0. Although an address usually consists of 32 bits, the addresses of x_addr and y_addr to be explained later are reduced in size to be expressed in immediate values in the instruction. Then the immediate value x_addr is placed over the control information C1 to be supplied to the instruction execution part EX1. Further, as RA1 is to be used for write control to r0, V1 out of the register information validity VR1 is asserted. In the register scoreboard RS, the write information of the instruction #2 is stored into the scoreboard cell SBE1.

At a point of time t3, as the actions of the instruction address stage A0 of the instructions #7, #8 and #9, the following is performed. First, as at the point of time t2, a request to fetch the instructions #7 and #8 is issued. The branching-related instruction decoder BDEC0 decodes the LDRS instruction of the instruction #3, adds the offset OFS0 to the program counter PC0 and the instruction #9 to generate the address of the instruction #9, and stores it at the repeat start address RS0. At the same time, the repeat start address RS0 and the end of repeat address RE0 are compared by a repeat address comparator CR0. Both represent the instruction #9, accordingly are identical and provide for 1 instruction repeat, this identity information is stored. Also, as at the point of time t1, the instruction fetch stage I0 of the instructions #5 and #6 is implemented. Further, as the actions of the instruction decode stages D0 and D1 of the instructions #3 and #4, the following is performed. As the instruction #3 is a branching-related instruction, the instruction decoder DEC0 turns the processing into an NOP. The instruction decoder DEC1, because the instruction #4 is an instruction to store a constant y_addr at r1, places the constant y_addr over the control information C1, and supplies it to the instruction execution part EX1. Further, as R1 is to be used for write control to r1, V1 out of the register information validity VR1 is asserted. Also, the instruction execution stage E1 of the instruction #2 is performed. The instruction execution part EX1 executes the instruction #2 in accordance with the control information C1. Thus the immediate value x_addr is supplied to the execution result DE1.

The register scoreboard RS supplies the write information of the instruction #2 from the scoreboard cell SBE1 and, as the control part CTL has an individual thread STH and write validity VE1, asserts the register write signal SE1. As a result, in the register file RF of the register module RM, the immediate value x_addr, which is the execution result DE1, is written at r0 designated by the write register number WE1. Also, the write information of the instruction #4 is stored into the scoreboard cell SBE1.

At a point of time t4, as the actions of the instruction address stages A0 and A1 of the instructions #11 and #12, the following is carried out. The branching-related instruction decoder BDEC0 of the instruction supply part IF0 decodes the THRDG/R instruction of the instruction #5, adds to PC0 the offset OFS0 for the instruction #11 to generate the top address of the new thread, i.e. the address of the instruction #11, places it over the instruction address IA0, and issues an instruction fetch request to the memory control part MC. Also, as at the point of time t1, the instruction fetch stage I0 of the instructions #7 and #8 is performed. Further, as the actions of the instruction decode stages D0 and D1, the following is carried out.

As the instruction #5 is a branching-related instruction, the instruction decoder DEC0 turns the processing into an NOP. The instruction decoder DEC1 decodes the instruction #6, places the immediate value 0 over the control information C1 as in the case of the instruction #2, supplies it to the instruction execution part EX1, and asserts V1 out of the register information validity VR1. It also implements the instruction execution stage E1 of the instruction #4 as it did for the instruction #2 at the point of time t3. The register scoreboard RS and the register module RM process the instructions #4 and #6 as they did for the instructions #2 and #4 at the point of time t3.

At a point of time t5, as the actions of the instruction address stage A0 of the instructions #9 and #10 the following is performed. First, as at the point of time t2, a request to fetch the instructions #9 and #10 is issued. The branching-related instruction decoders BDEC0 of the instruction supply part IF0 decodes the LDRC instruction of the instruction #7, places the number of repeats 8 over OFS0, and stores it at the number of repeats RC0. This completes the repeat setup. Also the instruction fetch stage I1 of the instructions #11 and #12 is implemented. The memory control part MC fetches the instructions #11 and #12, and the instruction supply part IF1 adds 0 to them as the thread synchronization number ID1*n*, holds the result in the instruction queue IQ1*n*, and also supplies them to the instruction multiplexer MX1 and MX0 as the instructions I10 and I11. However, as the thread synchronization numbers of both the data defining thread on the instruction supply part IF0 side and the data using thread of the instruction supply part IF1 are 0 and accordingly identical, the instruction multiplexers MX1 and MX0 selects the instruction supply part IF0 side, which is the data defining thread, in accordance with the selection logic of FIG. 21. As there is no instruction in the instruction queue IQ0*n* then, invalid instructions are supplied to the instruction decoders DEC0 and DEC1. Further, as the actions of the instruction decode stages D0 and D1 the instructions #7 and #8, the following is performed. Since the instruction #7 is a branching-related instruction, the instruction decoder DEC0 turns the processing into an NOP. The instruction decoder DEC1 decodes the instruction #8, and supplies NOP control. Furthermore, it implements the instruction execution stage E1 of the instruction #6 as it did the instruction #2 at the point of time t3. The register scoreboard RS and the register module RM processes instruction #6 as was the case with #4 at the point of time t3.

At a point of time t6, the instruction address stage A0 of the instruction #9 is implemented. At the instruction supply part IF0, the program counter PC0 and the end of repeat address RE0 become identical to cause the comparator CE0 to give an output of 1. As the number of repeats RC0 is eight, a comparator CC0 gives an output of 0 and, as the AND output is 1, the multiplexer MR0 selects the repeat start address RS0, which is supplied as the instruction fetch address IA0 and stored into the program counter PC0. The number of repeats RC0 is decremented to seven, which is selected by the multiplexer MC0 and stored at the number of repeats RC0. Further, as this is a repeat of 1 instruction, the instruction queue IQ0*n* is indicated to hold instructions from #9 onward. Further, the instruction address stage A1 of the instructions #13, #14 and #15 is implemented. The program counter PC1 of the instruction supply part IF1 is updated by adding 4, and a request to fetch the instructions #13 and #14 is issued. The branching-related instruction decoder BDEC1 decodes the LDRE instruction of the instruction #11, and stores the address of the instruction #15 at the end of repeat address RE1 as was the case with the instruction #5. Further, as at the point of time t1, the instruction fetch stage I0 of the instructions #9 and #10 is implemented. As the thread synchronization number ID0, 0 is added then. Incidentally, as the first repeat action is revealed when the end of repeat address RE0 is reached, the thread synchronization number is not 8 but 0 as before the repeat range is reached. As the indication to hold instructions is still in effect, the instructions #9 and #10 are held in the instruction queue IQ0*n* even after the supply. To add, the instructions #11 and #12 are held in the instruction queue IQ1*n*, and there is time for the branching-related instruction decoder BDEC1 to analyze the instructions #11 and #12 and judge both are branching-related instructions and there is no other instruction, the instruction queue IQ1*n* has no instruction to supply to the instruction decoder. Nor is there any instruction to be processed at the instruction fetch stage At a point of time t7, the instruction address stages A0 and A1 of the instructions #9 and #15 are implemented. The instruction supply part IF0 performs a repeat action as in the preceding cycle to increase the number of repeats RC0 to six. The branching-related instruction decoders BDEC1 of the instruction supply part IF1 decodes the LDRS instruction of the instruction #12, stores the address of the instruction #15 at the repeat start address RS1 as was the case with the instruction #3, and stores address identify information for 1 instruction repeat control. Also, the instruction fetch stages I0 and I1 of the instructions #9, #13 and #14 are implemented. The instruction supply part IF0 adds 7 as the thread synchronization number ID00 to the instruction #9 held in the instruction queue IQ0*n*, and supplies the result to the instruction multiplexer MX0 as the instruction I00. Incidentally, this action is done using the pre-decrement value simultaneously with the foregoing decrement. For this reasons, the added value is 7. As this is a repeat action the instruction immediately following the instruction #9 is not the instruction #10. Accordingly there is no instruction to be supplied as the 1 instruction I01, and the instruction validity IV01 of the instruction I01 is negated. The memory control part MC fetches the instructions #13 and #14, and the instruction supply part IF1 adds to them 0 as the thread synchronization number ID1*n*. The result is stored into the instruction queue IQ1*n*, and at the same time supplied to the instruction multiplexer MX1 and MX0 as the instruction I10 and I11. Though the instruction #9 then supplied as the instruction I00 entails register reading, as there is no prior data load instruction, all the write validities VL, VL0 and VL1 of the scoreboard information CM are negated, and no flow dependency arises.

Further, the instruction #13, as it immediately follows a fetch, is subjected to no executability determination. As a result, the instruction multiplexers MX1 and MX0 select the instructions I00 and I10, i.e. the instructions #9 and #13, and supply them to the instruction decoders DEC0 and DEC1. The instruction decode stage D0 of the instruction #9 is also implemented. The instruction decoder DEC0, as the instruction #9 is an instruction to load data from an address indicated by the register r0 into the register r2 and increment the register r0, supplies its control information C0. Further, as RA0 is used for the read and write control of r0 and RB0 for the write control of r2, VA0, V0 and LV0 out of the register information validity VR1 are asserted.

The register scoreboard RS supplies the register read number RA0 and the bypass control BPxy (x=E0, E1, L0, L1, L2, L3, TB0, TB1, TB2; y=A0, B0, A1, B1). In the diagram of pipeline operation shown in FIG. 18, the write and read register numbers and thread synchronization number of each scoreboard cell are added under each point of time. The hatched parts represent the thread 1 (data using thread) information and other parts, the thread 0 (data defining thread) information. At the point of time t7, as there is no valid write information, all the bypass controls BPxy are negated. The write information of the instruction #9 for r0 and r2 are stored into the scoreboard cells SBE0 and SBL0. The selection of the scoreboard cell SBL0 input follows the logic shown in FIG. 24. As the thread number TH0= =0 and the register information validity LV0 is asserted, the information of the instruction #9 on the pipe 0 side is selected.

At a point of time t8, the instruction address stages A0 and A1 of the instructions #9, #15 and #16 are implemented. The instruction supply part IF0 performs a repeat action as in the preceding cycle to increase the number of repeats RC0 to 5. The program counter PC1 of the instruction supply part IF1 is updated with the addition of 4, and a request to fetch the instructions #15 and #16 is issued. The branching-related instruction decoder BDEC1 decodes the LDRC instruction of the instruction #13, and stores 8 at the number of repeats RC1 as was the case with the instruction #7. Also, the instruction fetch stages I0 and I1 of the instructions #9 and #14 are implemented. The instruction supply part IF0, as it did at the point of time t, adds 6 to the instruction #9 as the thread synchronization number ID00, and supplies the result to the instruction multiplexer MX0 as the instruction I00. The instruction #9 then entails reading of the register r0, and there is a possibility of flow dependency occurrence. However, as the prior data load for which the write validity VL of the scoreboard information CM is asserted is for r2, there occurs no flow dependency attributable to the mismatch of register numbers. Further, the instruction supply part IF1 supplies the instruction multiplexer MX0 with the instruction #14, as the instruction I00, held in the instruction queue IQ1*n*. As a result, the instruction multiplexers MX0 and MX1 select the instructions I00 and I10, i.e. the instructions #9 and #14, and supply them to the instruction decoders DEC0 and DEC1. Also, as at the point of time t7, it implements the instruction decode stage D0 of the instruction #9 as well as the decode stage D1 of the instruction #13. As the instruction #13 is a branching-related instruction, the instruction decoder DEC1 turns the processing into an NOP. Further, the instruction execution stage E0 of the instruction #9 is implemented. The instruction execution part EX0, in accordance with the control information C0, places the read data DRA0 over the execution result DM0 as the load address, and supplies it to the memory control part MC. It also increments the read data DRA0, which is supplied as the execution result DE0 to the register module RM.

Figure 18:
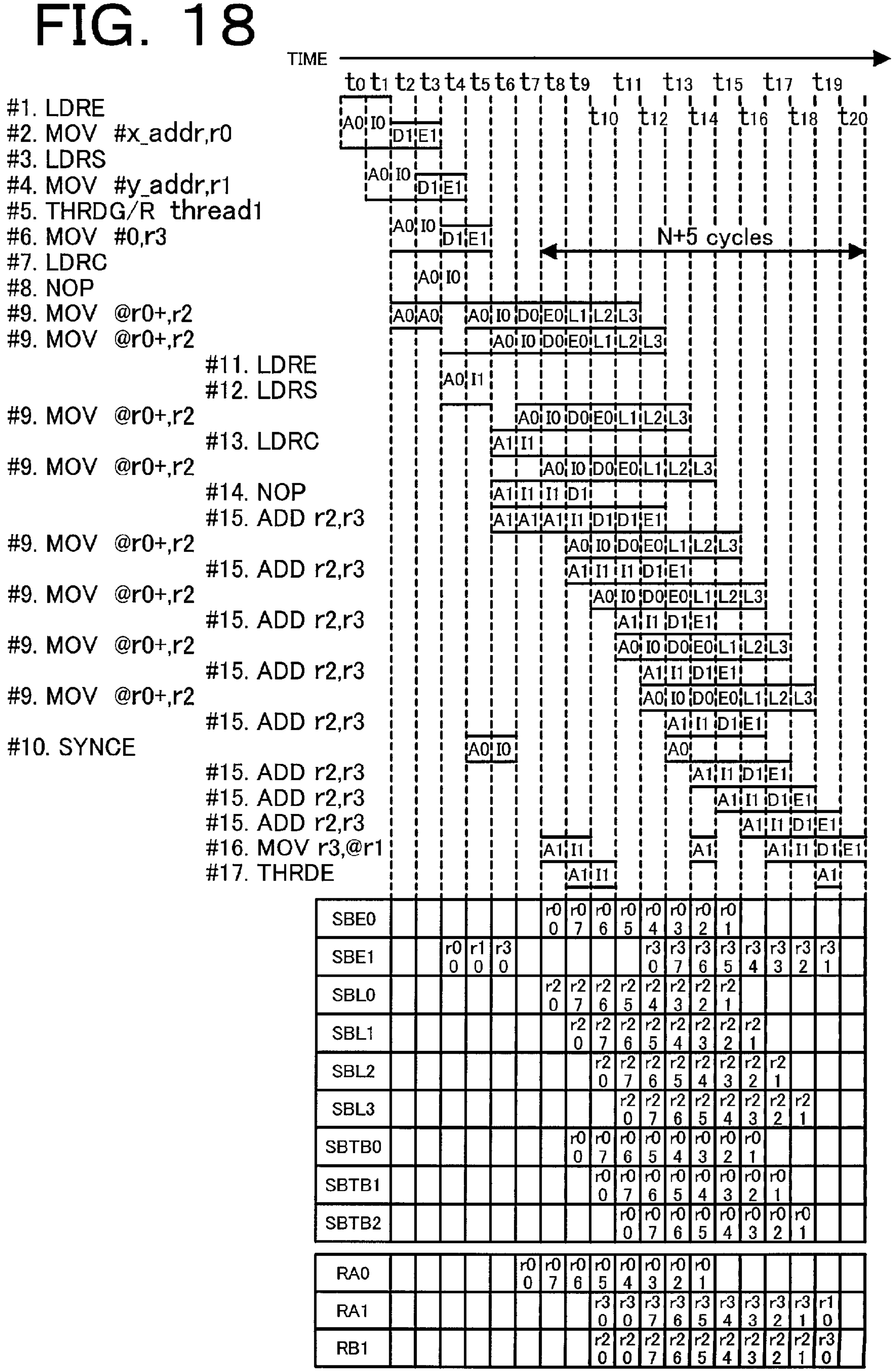
FIG. 18 illustrates the pipeline operation of the program of FIG. 16 at a load latency of 4.

In the register scoreboard RS, at the point of time t8, writes into the registers r0 and r2 are stored in the cells SBE0 and SBL0, respectively, with the read synchronization number of 0 as shown in FIG. 18. Further, r0 is supplied to the register read number RA0 with the thread synchronization number of 7. As the cell SBE0 and the read number RA0 are identical at r0 and, though there is a difference in thread synchronization number, 0 versus 7, the thread numbers THE0 and TH0 are both 0, BPE0A0 out of the bypass controls is asserted. Further in the scoreboard cells SBE0 and SBL0, as the thread numbers THE0 and THL0 are both 1, write-backs BNE0 and BNL0 are negated in accordance with the logic shown in FIG. 25. The next stage write control information NL0 generated by adding this write-back BNL0 is stored into the scoreboard cell SBL1. Also, in the control logic CTL, as the individual thread STH is negated and the write-back BNE0 with the thread number THE0 of 0, the write indication SE0 is negated and the temporary buffer control CE0 is asserted according to the sixth and seventh equations of FIG. 27. All Sx (x=TB0, TB1, TB2, L3, E0, E1) and Cx are negated because the write validity Vx is negated. As a result, as shown in the table of FIG. 27, the data selections M0, M1 and M2 become E0, TB0 and TB1, respectively. Then, the next stage write control information units NM0, NM1 and NM2 turn into NE0, NTB0 and NTB1, respectively, and they are stored into the temporary buffer control information spaces SBTB0, SBTB1 and SBTB2. Further, the write information of the instruction #9 is stored into the cells SBE0 and SBL0 as at the point of time t7. In the register module RM, in accordance with the data selections M0, M1 and M2, the execution result DE0 and the temporary buffer data DTB0 and DTB1 are written into the temporary buffers DTB0, DTB1 and DTB2. Also, as the bypass control BPE0A0 has been asserted, in the bypass multiplexer MA0, the execution result DE0 is selected as the read data DRA0 in accordance with the logic shown in FIG. 30.

At a point of time t9, the instruction address stages A0 and A1 of the instructions #9 and #15 is implemented. The instruction supply part IF0 performs a repeat action as in the preceding cycle to increase the number of repeats RC0 to 4. In the instruction supply part IF1, the program counter PC1 and the end of repeat address RE1 prove identical in the address of the instruction #15, and a repeat action is started, as was the case with the instruction #9, to increase the number of repeats RC0 to 7.

Also, the instruction fetch stages I0 and I1 of the instructions #9, #15 and #16 are implemented. The instruction supply part IF0, as at the point of time t7, adds 5 to the instruction #9 as the thread synchronization number ID00, and supplies the resultant instruction I00 to the instruction multiplexer MX0. Though the instruction #9 then entails reading of the register r0, as the prior data load for which the write validities VL and VL0 are asserted is for r2, there occurs no flow dependency attributable to the mismatch of register numbers. The memory control part MC fetches the instructions #15 and #16, and the instruction supply part IF1 stores them into the instruction queue IQ1*n* and, at the same time, supplies them as the instructions I10 and I11 to the instruction multiplexers MX1 and MX0. As the instructions I10 and I11 immediately follow a fetch, the instruction multiplexer MX1 performs no executability determination. As a result, the instruction multiplexers MX1 and MX0 select the instructions I00 and I10, i.e. the instructions #9 and #15, and supply them to the instruction decoders DEC0 and DEC0. Further, as at the point of time t7, the instruction decode stage D0 of the instruction #9 is also implemented. Also, the instruction decoder DEC1 implements the instruction decode stage D1 of the instruction #14. As the instruction #14 is for NOP, the control information C1 carries out NOP processing. Further, as at the point of time t8, the instruction execution stage E0 of the instruction #9 is implemented. Also, the memory control part MC performs the data load stage L1 of the instruction #9.

The state of the register scoreboard RS at the point of time t9 is as shown in FIG. 18. As at the point of time t8, the bypass control BPE0A0 is asserted. Also, the cell SBTB0 and the read number RA0 become identical at r0 and, as the thread numbers THTB0 and TH0 are both 0, the bypass control BPTB0A0 is asserted. As at the point of time t8, the write-backs BNE0 and BNL are negated, the cell SBL1 is updated, the write indication SE0 is negated, and the temporary buffer control CE0 is asserted. Further, in the cells SBL1 and SBTB0, as the thread numbers THL1 and THTB0 are 1, the write-backs BNL1 and BNTB0 continue to be negated in accordance with the logic shown in FIG. 26.

The next stage write control information NL1 generated by adding this write-back BNL1 is stored into the scoreboard cell SBL2. Then, the write indication STB0 is negated according to the sixth and seventh equations of FIG. 27, and the temporary buffer control CTB0 is asserted. As a result, as shown in the table of FIG. 27, the data selections M0, M1 and M2 become E0, TB1 and TB2, respectively, as at the point of time t8, and consequently the temporary buffer control information units SBTB0, SBTB1 and SBTB2 are updated. Further, the write information of the instruction #9 is stored into the cells SBE0 and SBL0 as at the point of time t7. In the register module RM as well, as at the point of time t8, the temporary buffers DTB0, DTB1 and DTB2 are updated in accordance with the data selections M0, M1 and M2. Further, as the bypass controls BPE0A0 and BPTB0A0 have been asserted, the execution result DE0 is selected as the read data DRA0 is selected in the bypass multiplexer MA0 in accordance with the logic shown in FIG. 30. In the temporary buffer TB then, the temporary buffer data DTB0 are read by the bypass control BPTB0A0 as the temporary buffer read data TBA0, and in the bypass multiplexer MA0, too, BPTBA0 is asserted. However, as the bypass control BPE0A0 is also asserted, a new execution result DE0 is selected in accordance with the logic shown in FIG. 30.

At a point of time t10, the instruction address stages A0 and A1 of the instructions #9 and #15 are implemented. The instruction supply part IF0 performs a repeat action as in the preceding cycle to increase the number of repeats RC0 to 4. The instruction supply part IF1, though it performs a repeat action as in the preceding cycle, keeps the number of repeats RC0 unchanged at 7 because the register scoreboard RS asserts the stall STL1 to be explained later. Also, the instruction fetch stages I0 and I1 of the instructions #9, #15 and #17 are implemented. The instruction supply part IF0, as at the point of time t7, adds 4 to the instruction #9 as the thread synchronization number ID00 and supplies it to the instruction multiplexer MX0 as the instruction I00. Though the instruction #9 then entails reading of the register r0, as the prior data load for which the write validities VL, VL0 and VL1 are asserted is for r2, there occurs no flow dependency attributable to the mismatch of register numbers. The memory control part MC fetches the instruction #17 and the next instruction, and the instruction supply part IF1 stores them into the instruction queue IQ1*n*. and, at the same time, supplies them as the instructions I10 and I11 to the instruction multiplexers MX1 and MX0. It also supplies the instruction #15 to the instruction multiplexer MX1 as the instruction I10. Although the instruction I10 then, i.e. the instruction #15, entails reading of the registers r2 and r3, as the prior data loads for which the write validities VL, VL0 and VL1 are asserted are the thread synchronization numbers 7, 6 and 5, there occurs no flow dependency. As this is a repeat action the instruction immediately following the instruction #15 is not the instruction #16. Accordingly there is no instruction to be supplied as the instruction I11, and the instruction validity IV11 of the instruction I11 is negated. As a result, the instruction multiplexers MX1 and MX0 select the instructions I00 and I10, i.e. the instructions #9 and #15, and supply them to the instruction decoders DEC0 and DEC1. Further, as at the point of time t7, the instruction decoder DEC0 implements the instruction decode stage D0 of the instruction #9 and the instruction decode stage D1 of the instruction #15. As the instruction #15 is an instruction to add the registers r2 and r3 and to store the sum at r3, its control information C1 is supplied. Further, as RA0 is used for the read and write control of r3 and RB0, for the read control of r2, VA0, VB0 and V0 out of the register information validity VR1 are asserted. Also, as at the point of time t8, the instruction execution stage E0 of the instruction #9 is implemented. Further, the memory control part MC performs the data load stages L1, L2 and L3 of the instruction #9.

The state of the register scoreboard RS at the point of time t10 is as shown in FIG. 18. As at the point of time t9, the bypass controls BPE0A0 and BPTB0A0 are asserted. Also, as the cell SBTB1 and the number RA0 become identical at r0 and the thread numbers THTB1 and TH0 are both 0, the bypass control BPTB1A0 is asserted. Further, as the cell SBL2 and the read number RB1 of the instruction #15 become identical at r2 and the thread synchronization numbers IDL2 and ID1 are both 0, the bypass control BPL2B1 is asserted. Then, the stall STL1 is asserted in the scoreboard control part CTL, the instruction #15 is deterred from execution, and the write validity to be written into the scoreboard cell SBE1 is negated. Also, as at the point of time t9, the write-backs BNE0, BNL0, BNL1 and BNTB0 are negated, the cells SBL1 and SBL2 are updated, the write indications SE0 and STB0 are negated, and the temporary buffer controls CE0 and CTB0 are asserted. Further, in the cells SBL2 and SBTB1, as the thread number TH1 is 1 and the thread synchronization numbers IDL2 and IDTB1 are identical with ID1, all being 0, the write-backs BNL2 and BNTB1 are asserted in accordance with the logic shown in FIG. 26. The next stage write control information NL2 generated by adding this write-back BNL2 is stored into the scoreboard cell SBL3. Then, the write indication STB1 is asserted according to the sixth and seventh equations of FIG. 27, and the temporary buffer control CTB1 is negated. As a result, as shown in the table of FIG. 27, the data selections M0, M1 and M2 become E0, TB1 and TB2, respectively, as at the point of time t8, and consequently the temporary buffer control information units SBTB0, SBTB1 and SBTB2 are updated. Further, the write information of the instruction #9 is stored into the cells SBE0 and SBL0 as at the point of time t7. In the register module RM as well, as at the point of time t8, the temporary buffers DTB0, DTB1 and DTB2 are updated in accordance with the data selections M0, M1 and M2. Then the temporary buffer data DTB1 are written back into the register r0 of the register file RF by the write indication STB1. Further, as the bypass controls BPE0A0, BPTB0A0 and BPTB1A0 have been asserted, the execution result DE0 is selected as the read data DRA0 in the bypass multiplexer MA0 in accordance with the logic shown in FIG. 30. In the temporary buffer TB then, the temporary buffer data DTB0 are read by the bypass controls BPTB0A0 and BPTB1A0 as the temporary buffer read data TBA0, and in the bypass multiplexer MA0, too, BPTBA0 is asserted. However, as the bypass control BPE0A0 is also asserted, the latest execution result DE0 is selected in accordance with the logic shown in FIG. 30.

At a point of time t11, the instruction address stages A0 and A1 of the instructions #9 and #15 are implemented. The supply part IF0 performs a repeat action as in the preceding cycle to increase the number of repeats RC0 to 4. The supply part IF0 again performs a repeat action as at the point of time 9 to increase the number of repeats RC0 to 6. Also, the instruction fetch stages I0 and I1 of the instructions #9 and #15 are implemented. The instruction supply part IF0, as at the point of time t7, adds 4 to the instruction #9 as the thread synchronization number ID00 and supplies it to the instruction multiplexer MX0 as the instruction I00. As at the point of time t10, no flow dependency then occurs to the instruction #6. The instruction supply part IF1 adds 7 to the instruction #15 as the thread synchronization number ID01 and supplies it to the instruction multiplexer MX1 as the instruction I10. As at the point of time t10, no flow dependency occurs to the instruction #1. As a result, the instruction multiplexers MX1 and MX0 select the instruction I00 and I10, i.e. the instructions #9 and #15, and supply them to the instruction decoders DEC0 and DEC1. Further, as at the point of time t7, the instruction decoders DEC0 implements the instruction decode stage D0 of the instruction #9. It also implements the instruction decode stage D1 of the instruction #15. As the instruction #15 was prevented in the preceding cycle by the stall STL1 from execution, the instruction decoder DEC1 does not update input instruction, and instead supplies again the decoded result of the instruction #15. Also, as at the point of time t8, the instruction execution stage E0 of the instruction #9 is implemented. Further, the memory control part MC implements the data load stages L1, L2 and L3 of the instruction #9.

The state of the register scoreboard RS at the point of time t11 is as shown in FIG. 18. Incidentally, as the instruction #15 was prevented from execution in the preceding cycle by the assertion of the stall STL1, the register information MR1 is not updated. As at the point of time t9, the bypass controls BPE0A0, BPTB0A0 and BPTB0A1 are asserted. Also, the cell SBTB2 and the read number RA0 become identical at r0 and, as the thread numbers THTB2 and TH0 are both 0, the bypass control BPTB2A0 is asserted. Further, the cell SBL3 and the read number RB1 become identical at r2 and, as the thread synchronization numbers IDL3 and ID1 are both 0, the bypass control BPL3B1 is asserted. Also, as at the point of time t9, the write-backs BNE0, BNL0, BNL1 and BNTB0 are negated, the cells SBE0, SBL0, SBL1 and SBL2 are updated, the write indications SE0 and STB0 are negated, and the temporary buffer controls CE0 and CTB0 are asserted. Further, as the thread numbers THL2 and THTB1 are 1 in the cells SBL2 and SBTB1, the write-backs BNL2 and BNTB1 continue to be negated in accordance with the logic shown in FIG. 26. Also, as the thread synchronization number IDL3 and IDTB2 are identical with ID0, all being 0, in the cells SBL3 and SBTB2, the write-backs BNL3 and BNTB2 are asserted in accordance with the logic shown in FIG. 26. Then the write indications SL3 and STB1 are asserted according to the sixth and seventh equations of FIG. 27, and the temporary buffer controls CL3 and CTB2 are negated. As a result, as shown in the table of FIG. 27, the data selections M0, M1 and M2 become E0, TB1 and TB2, respectively, as at the point of time t8, and consequently the temporary buffer control information units SBTB0, SBTB1 and SBTB2 are updated. In the register module RM as well, as at the point of time t8, the temporary buffers DTB0, DTB1 and DTB2 are updated in accordance with the data selections M0, M1 and M2. Then the load data DL3 and the temporary buffer data DTB2 are written back into the registers r2 and r0 of the register file RF by the write indications SL3 and STB2. Further, as the bypass controls BPE0A0, BPTB0A0 and BPTB1A0 have been asserted, the execution result DE0 is selected as the read data DRA0 in the bypass multiplexer MA0 in accordance with the logic shown in FIG. 30. In the temporary buffer TB then, the temporary buffer read data DTB0 are read by the bypass controls BPTB0A0, BPTB1A0 and BPTB2A0 as the temporary buffer read data TBA0, and in the bypass multiplexer MA0, too, BPTBA0 is asserted. However, as the bypass control BPE0A0 is also asserted, the latest execution result DE0 is selected in accordance with the logic shown in FIG. 30. Also, as the bypass control BPL3B1 has been asserted, in the bypass multiplexer MB1, the load data DL3 are selected as the read data DRB1 in accordance with the logic shown in FIG. 30. The read data DRA1 are read out of the register r3 of the register file RF.

At a point of time t12, as at the point of time t11, the instruction address stages A0 and A1 and the instruction fetch stages I0 and I1 of the instructions #9 and #15 are implemented. Further, as at the point of time t10, the instruction decode stages D0 and D1 of the instructions #9 and #15, the instruction execution stage E0 of the instruction #9 and the data load stages L1, L2 and L3 of the instruction #9 are implemented. Then, the execution stage E1 of the instruction #15 is implemented. In the instruction execution part EX1, the read data DRA1 and DRB1 are added, and the sum is supplied to the execution result DE1.

The state of the register scoreboard RS at the point of time t12 is as shown in FIG. 18. Though it is substantially the same as at the point of time t11 except that the thread synchronization number is less by 1, the write information for the register r3 of the cell SBE1 is greater. Then, the cell SBE1 and the read number RB0 become identical at r3 and, as the thread numbers THE1 and TH1 are both 0, the bypass control BPE1A1 is asserted. As at the point of time t11, each cell in the scoreboard is updated. In the register module RM, too, as at the point of time t11, the temporary buffer TB and the registers r2 and r0 of the register file RF are updated, and the read data DRA0 and DRB1 are selected. Also, as the bypass control BPE1A1 has been asserted, in the bypass multiplexer MA1, the execution result DE1 is selected as the read data DRA1 in accordance with the logic shown in FIG. 30.

At a point of time t13, the instruction address stages A0 and A1 of the instructions #9 and #15 are implemented. The instruction supply part IF0, though it performs a repeat action as in the preceding cycle, as the number of repeats RC0 is 1, the output of a number-of-repeats comparator CC0 is 1 and the AND gate is 0, with the result that the instruction address multiplexer MR0 indicates the address+4 of the instruction #9, i.e. the instruction next to the instruction #10, and releases the instructions of the instruction buffer from #9 onward from their held state. The number of repeats RC0 is decremented to 0. Incidentally, the description of the instruction next to #10 and the following instructions will be dispensed with at and after the point of time t14. The instruction supply part IF1, as at the point of time t9, a repeat action to increase the number of repeats RC0 to 4. As at the point of time t12, the instruction fetch stages I0 and I1, the instruction decode stages D0 and D1 and the instruction execution stages E0 and E1 of the instructions #9 and #15, together with the data load stages L1, L2 and L3 of instruction #9, are implemented.

The state of the register scoreboard RS at the point of time t13 is as shown in FIG. 18. It is the same as at the point of time t12 except that the thread synchronization number is less by 1. Then, as at the point of time t12, each cell in the scoreboard is updated, and the temporary buffer TB and the register file RF in the register module RM are updated, with the read data DRA0, DRA1 and DRB1 being selected.

At a point of time t14, as at the point of time t13, the instruction address stage A1 and the instruction fetch stage I1 of the instruction #15, the instruction decode stage D0 and D1 and the instruction execution stages E0 and E1 of the instruction #9 and the instruction #15 and the data load stages L1, L2 and L3 of the instruction #9 are implemented. Further, as the process has been released from the repeat mode, instruction #10 is decoded by the branching-related instruction decoder BDEC0 to perform SYNCE instruction processing. The SYNCE instruction is an instruction to wait for the completion of a data using thread. The data using thread, i.e. the thread 1, as the thread synchronization number ID1 returns to 0 at the end of repeat, will if the thread synchronization number ID0 remains at 0 on account of the rule that the data use thread should not pass the data defining thread. Therefore, the instruction multiplexers MX0 and MX1 are so controlled as to override this rule from the time of decoding the SYNCE instruction until the end of the data using thread. This control, as it is utilized from the instruction #16, it is stated as the instruction address stage A1 of the instruction #16 in FIG. 18.

The state of the register scoreboard RS at the point of time t14 is as shown in FIG. 18. It is the same as at the point of time t13 except that the thread synchronization number is less by 1. Then, as at the point of time t13, each cell in the scoreboard is updated, and the temporary buffer TB and the register file RF in the register module RM are updated, with the read data DRA0, DRB1 and DRA1 being selected.

At a point of time t15, as at the point of time t14, the instruction address stage A1, the instruction fetch stage I1 and the instruction decode stage D1 of the instruction #15, the instruction execution stages E0 and E1 of the instruction #9 and the instruction #15 and the data load stages L1, L2 and L3 of the instruction #9 are implemented.

The state of the register scoreboard RS at the point of time t15 is as shown in FIG. 18. It is the same as at the point of time t14 except that the thread synchronization number is less by 1 and r0 is not read at RA0. Then, as at the point of time t14, each cell in the scoreboard is updated, though no new write information is held in the scoreboard cells SBE0 and SBL0 and these cells are invalidated. Also, the temporary buffer TB and the register file RF in the register module RM are updated, and the read data DRA1 and DRB1 are selected.

At a point of time t16, as at the point of time t15, the instruction address stage A1, the instruction fetch stage I1, the instruction decode stage D1 and the instruction execution stage E1 of the instruction #15 and the data load stages L1, L2 and L3 of the instruction #9 are implemented. At the instruction address stage A1, though the instruction supply part IF1 performs a repeat action as in the preceding cycle, as the number of repeats RC0 is 1, the output of the number-of-repeats comparator CC0 is 1 and the AND gate is 0, with the result that the instruction address multiplexer MR1 indicates the address+4 of the instruction #15, i.e. the instruction #17, and releases the instructions of the instruction buffer from #15 onward from their held state. The number of repeats RC0 is decremented to 0.

The state of the register scoreboard RS at the point of time t16 is as shown in FIG. 18. It is the same as at the point of time t15 except that the thread synchronization number is less by 1 and the cells SBE0 and SBL0 are invalidated. Then, as at the point of time t15, each cell in the scoreboard is updated, though no new write information is held in the scoreboard cells SBL1 and SBTB0 and these cells are invalidated. Also, the temporary buffer TB and the register file RF in the register module RM are updated, and the read data DRA1 and DRB1 are selected, though no writing into the register r2 is done.

At a point of time t17, as at the point of time t16, the instruction fetch stage I1, the instruction decode stage D1 and the instruction execution stage E1 of the instruction #15 and the data load stages L2 and L3 of the instruction #9 are implemented.

The state of the register scoreboard RS at the point of time t17 is as shown in FIG. 18. It is the same as at the point of time t16 except that the thread synchronization number is less by 1 and the cells SB10 and SBTB0 are invalidated. Then, as at the point of time t16, each cell in the scoreboard is updated, though no new write information is held in the scoreboard cells SBL2 and SBTB1 and these cells are invalidated. Also, the temporary buffer TB and the register file RF in the register module RM are updated, and the read data DRA1 and DRB1 are selected.

At a point of time t18, the instruction fetch stage I1 of the instruction #16 is implemented. The instruction supply part IF1 supplies the instruction #16 of the instruction queue IQ1*n* to the instruction decoders DEC1 via the instruction multiplexer MX1 as the instruction I10. Although the thread synchronization number then is 0, the same as the data defining thread, the data defining thread side is waiting for the completion of the data using thread in accordance with the SYNCE instruction, and an instruction of the same thread synchronization number can now be issued. Also, as at the point of time t17, the instruction decode stage D1 and the instruction execution stage E1 of the instruction #15 and the data load stage L3 of the instruction #9 are implemented.

The state of the register scoreboard RS at the point of time t18 is as shown in FIG. 18. It is the same as at the point of time t17 except that the thread synchronization number is less by 1 and the cells SBL2 and SBTB1 are invalidated. Then, as at the point of time t17, each cell in the scoreboard is updated, though no new write information is held in the scoreboard cells SBL3 and SBTB2 and these cells are invalidated. Also, the temporary buffer TB and the register file RF in the register module RM are updated, and the read data DRA1 and DRB1 are selected.

At a point of time t19, the instruction decode stage D1 of the instruction #16 is implemented. The instruction #16 is an instruction to store the contents of the register r3 at an address indicated by the register r1. The instruction decoder DEC1 supplies the control information C1 for this purpose. Also, out of the register validities VR1, VA1 and Vb1 are asserted. As at the point of time t17, the instruction execution stage E1 of the instruction #15 is implemented. Also, the branching-related instruction decoder BDEC1 of the instruction supply part IF1 decodes THRDE of the instruction #17, stops the instruction supply part IF1, and asserts the end of thread ETH1.

The state of the register scoreboard RS at the point of time t19 is as shown in FIG. 18. It is the same as at the point of time t18 except that the thread synchronization number is less by 1, the cells SBL3 and SBTB2 are invalidated, and the register read numbers RA1 and RB1 are different. Then, as at the point of time t18, each cell in the scoreboard is updated, though no new write information is held in the scoreboard cell SBE1 and this cell is invalidated. Also, the register file RF in the register module RM is updated, though only the register r3 is updated. Further, the read data DRAL are read out of r1 in the register file RF, and the cell SBEL and the register number of the read number RB1 become identical at r3, and the thread numbers THE1 and TH1 become identical with the result that the bypass control BPE1B1 is asserted, and the execution result DE1 is selected in the read data multiplexer MB1 as DRB1.

At a point of time t20, the instruction execution stage E1 of the instruction #16 is implemented. The read data DRA1 are supplied to the execution result DE1 as a store address in accordance with the control information C1, and the read data DRB1 are supplied to the execution result DM1 as data. Also, as the end of thread ETH has been asserted, the scoreboard control CTL asserts the individual thread STH in accordance with the fifth equation shown in FIG. 27.

As described so far, the multi-thread system of this embodiment of the invention can conceal the data load time.

In this embodiment of the invention, the data defined by the data defining thread and written into the temporary buffer TB of the register module RM are not used by the data using thread. The data used by the data using thread are load data, which are used immediately after their loading and directly written into the register file RF. Where the temporary buffers are wastefully used in this way, if the data load time is extended, even more buffers will be needed for wasteful writing. If the data load time is 30 units, executing the program of FIG. 16 without a stall by a temporary buffer-full STLTB would require 29 temporary buffers. Since data in temporary buffers have to be read out under bypass control as required and supplied to the instruction execution part, an increase in the number of temporary buffers would mean an increased hardware volume and a drop in execution speed. A way to avoid such problems is to confine the register to be defined by the data defining thread and used by the data using thread.

For instance, a specific register or group of registers can be assigned as the link register(s) by a link register assigning instruction, and it is assigned only the assigned link register(s) can be used for data transfers between threads. Then, if the program of FIG. 16 is used, r2 is assigned as the link register. In this way, other registers than r2 will need no consideration about reverse dependency and output dependency between threads, and therefore execution results can be directly written into the register file RM. Then, the use of temporary buffers in the pipeline operation of FIG. 18 will be totally eliminated.

In this case, where the data load time is 30 units, for the execution of the program of FIG. 16 without stall, 30 load stages will be sufficient with the addition of L4 through L29. In this connection, SBL4 through SBL29 are added to the register scoreboard. Then, bypass controls from SBL0 through SBL28 will all be reflected only in the stalls STL0 and STL1, and there will be no increase in the number of data bypasses.

For a conventional processor, there are a plurality of definitions of the data load time, for a case in which an on-chip cache is hit, one in which it is in an on-chip memory, one in which an off-chip cache is hit, one in which it is in an off-chip memory and so forth. For instance, where the data load time can be 2, 4, 10 or 30 units, by providing bypasses matching SBL1, SBL3, SBL9 and SBL29 and differentially using a stall or a bypass according to the length of the data load time, the present invention can be adapted to a plurality of data load time lengths. In addition, though not defined for this embodiment of the invention, there are arithmetic instructions taking a long time to execute, such as division instructions. It is readily possible for persons decently skilled in the art to realize similar hardware for such instructions to that for data loading.

Although the threads 0 and 1 are fixed as a data defining thread and a data using thread, respectively, according to this embodiment, eliminating this fixation is readily possible for persons decently skilled in the art as stated above. It is also conceivable to configure a program in which, after the completion of processing of the data defining thread, this thread is ended by a THRDE instruction, to use the data using thread as a new data defining thread, actuate a new thread by a THRDG instruction, and assign the actuated thread as the new data using thread. In this way, the SYNCE instruction used in this embodiment can be dispensed with, the period during which only one thread is available can be shortened, and the performance can be correspondingly enhanced.

Figure 31:
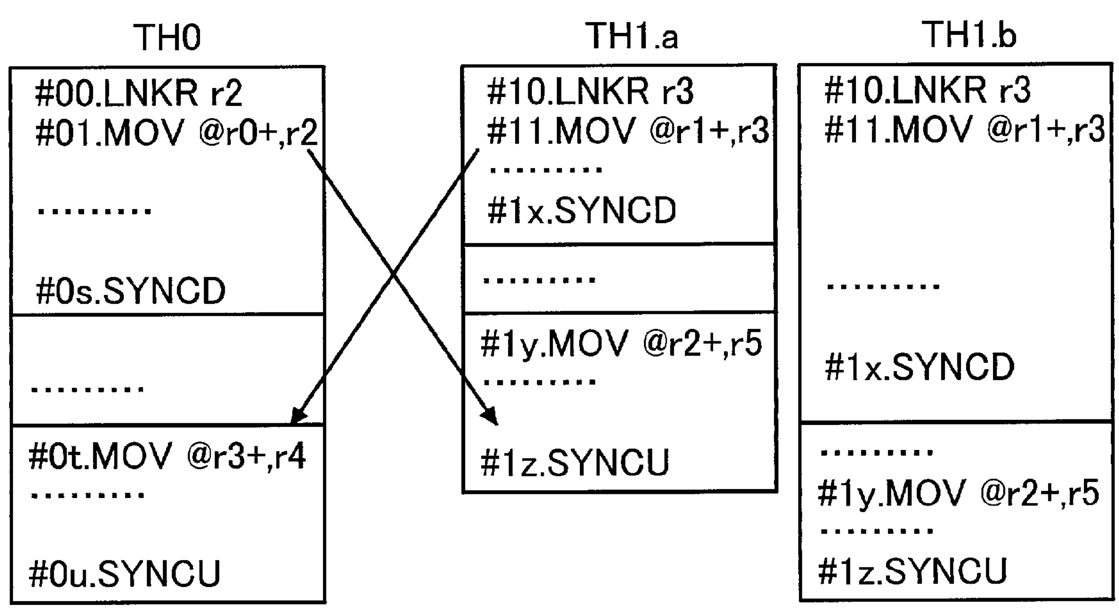
FIG. 31 illustrates an example of inter-thread two-way data communication system.

In addition, this embodiment supposes one-way flow of data, but the link register assignment described above would make possible two-way data communication as well. A different link register is assigned to each direction, a data definition synchronizing instruction SYNCD is issued upon completion of the execution of the data defining instruction for the link register by each thread, and a data use synchronizing instruction SYNCU is issued upon completion of the use of the link register. Then, the thread synchronization number is updated at the time of issuing the SYNCU instruction. Instead of the SYNCU instruction, repeating can be used for synchronization as in this embodiment. Two-way exchanging of data in a plurality of threads would be effective in simultaneous processing of loose coupling in which data dependency is scarce by does exist. FIG. 31 illustrates a flow or program processing in an inter-thread two-way data communication system.

First, r2 is assigned for the direction from the thread TH0 to the thread TH1 and r3 for the other direction as the link register by a link register assigning instruction RNCR. Then, link register defining instructions #01 and #11 are executed in the threads TH0 and TH1, respectively. After that, a data definition synchronizing instruction SYNCD is issued to execute link register use instructions #0*t* and #1*y*, respectively. Finally, a data use synchronizing instruction SYNCU is issued. The execution time may vary from one thread to another. A case in which the execution of the thread TH1 is quicker than the thread TH0 is shown in TH1.*a* of FIG. 31. In this case, as the link register use instruction #1*y* of the thread TH1 waits of the issue of the thread TH0 data definition synchronizing instruction SYNCD, there will be no wrong detection of flow dependency. The contrary case in which the execution of the thread TH1 is shown in TH1.*b* of FIG. 31. In this case, as the link register use instruction #1*t* of the thread TH0 waits for the issue of the thread TH1 data definition synchronizing instruction SYNCD, there will be wrong detection of flow dependency. The data definition synchronizing instruction SYNCD has changed the order of execution priority between the threads. It has to be noted, however, that the execution priority in this example differs from one link register to another. For r2, the thread TH0 is given priority over TH1, and for r3, the thread TH1 is prior to TH0.

While inter-thread data communication is carried out via registers in this embodiment of the invention, it is readily possible for persons decently skilled in the art to accomplish inter-thread data communication via memories by managing memories by the use of the whole or part of memory addresses instead of register numbers.

The present invention makes it possible for achieving performance standards comparable to large-scale out-of-order execution or software pipelining with simple and small hardware by adding only a simple control mechanism to a conventional multi-thread processor. Furthermore, a level of performance which a conventional multi-thread processor cannot achieve with simultaneous or time multiplex execution of many threads can be attained with only two or so threads according to the invention. The overhead burden of thread generation and completion can be reduced correspondingly to the reduction in the number of threads, and the hardware for storing the states of many threads can also be saved.

What is claimed is:

1. A processor comprising:

a plurality of program counters;

one or a plurality of instruction execution parts; and means for selectively supplying for instruction flows of a plurality of threads to said one or the plurality of instruction execution parts, each of said threads corresponding to each of said program counters, and means for storing thread information corresponding to each of the plurality of threads, each of the thread information having a thread synchronization number which indicates a progress level corresponding to the thread, wherein said threads can be executed either simultaneously or in time multiplex, wherein said processor has changeable execution priorities of said plurality of thread in time multiplex, and wherein when a thread synchronization number of a first thread included in the plurality of threads is the same value as a thread synchronization number of a second thread included in the plurality of threads, the execution priority of the first thread is higher than the execution priority of the second thread.

2. The processor, according to claim 1, whereby it is made possible to reduce hardware volume of said processor and data deliveries between said threads through a shared resource by causing said threads to share part or the whole of processor resources except said program counters.

3. The processor, according to claim 1, wherein a hardware of the processor is enabled to achieve synchronization among said threads without requiring any intervening instruction by using the number of repeats as a first criterion of priority and priorities among said threads as a second criterion of priority.

4. The processor, according to claim 1, further comprising a buffer for temporarily holding the execution results of threads other than that having top priority, thereby making possible conflict-free execution of such other threads by storing them in their primary storing location after the completion or synchronization report of processing with higher priority.

5. The processor, according to claim 1, wherein the use of undefined data can be eliminated and threads other than that having top priority can be executed without a conflict by confining data dependency among said threads so that data flow in only one direction and executing a data using thread only when it is the top priority thread.

6. The processor, according to claim 1, wherein a storing location for data to be used in inter-thread data communication is confined.

7. The processor, according to claim 6, wherein a plurality of locations are defined for data storage, independent of each and differentiated by the combination of threads and the direction of communication.

8. The processor, according to claim 7, wherein an execution priority is defined for each of said data storing locations.

9. The processor, according to claim 6, wherein said data storing location is part of a register or memory.

10. The processor, according to claim 1, further having a thread priority raising instruction for threads lower in priority to facilitate changing priority among said threads.

11. The processor, according to claim 1, further having a data definition synchronizing instruction for other threads to make possible the use of data by other threads after synchronization.

* * * * *